US010131977B2

(12) United States Patent
Hiraide et al.

(10) Patent No.: US 10,131,977 B2
(45) Date of Patent: Nov. 20, 2018

(54) FERRITIC STAINLESS STEEL SHEET HAVING EXCELLENT BRAZABILITY, HEAT EXCHANGER, FERRITIC STAINLESS STEEL SHEET FOR HEAT EXCHANGERS, FERRITIC STAINLESS STEEL, FERRITIC STAINLESS STEEL FOR MEMBERS OF FUEL SUPPLY SYSTEMS, AND MEMBER OF FUEL SUPPLY SYSTEM

(71) Applicant: Nippon Steel & Sumikin Stainless Steel Corporation, Tokyo (JP)

(72) Inventors: Nobuhiko Hiraide, Hikari (JP); Tooru Matsuhashi, Hikari (JP); Noriyo Morihiro, Hikari (JP); Naoto Ono, Nagoya (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 525 days.

(21) Appl. No.: 14/770,680

(22) PCT Filed: Mar. 24, 2014

(86) PCT No.: PCT/JP2014/058112
§ 371 (c)(1),
(2) Date: Aug. 26, 2015

(87) PCT Pub. No.: WO2014/157104
PCT Pub. Date: Oct. 2, 2014

(65) Prior Publication Data
US 2016/0002760 A1    Jan. 7, 2016

(30) Foreign Application Priority Data

Mar. 29, 2013 (JP) ................................. 2013-071740
Jul. 17, 2013 (JP) ................................. 2013-148951

(51) Int. Cl.
| | | |
|---|---|---|
| C22C 38/60 | (2006.01) | |
| C21D 9/46 | (2006.01) | |
| C22C 38/00 | (2006.01) | |
| C22C 38/26 | (2006.01) | |
| C23G 1/08 | (2006.01) | |
| C22C 38/02 | (2006.01) | |
| C22C 38/04 | (2006.01) | |
| C22C 38/06 | (2006.01) | |
| C22C 38/20 | (2006.01) | |
| C22C 38/22 | (2006.01) | |
| C22C 38/24 | (2006.01) | |

(Continued)

(52) U.S. Cl.
CPC .......... *C22C 38/60* (2013.01); *B23K 1/0012* (2013.01); *B23K 1/19* (2013.01); *C21D 6/002* (2013.01); *C21D 9/46* (2013.01); *C22C 38/00* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/42* (2013.01); *C22C 38/44* (2013.01); *C22C 38/48* (2013.01); *C23G 1/086* (2013.01); *F28F 21/083* (2013.01); *C21D 2211/005* (2013.01); *F02M 2200/05* (2013.01); *F02M 2200/9053* (2013.01); *F28D 21/0003* (2013.01); *F28F 2275/04* (2013.01)

(58) Field of Classification Search
CPC ...................................................... B23K 1/0012
See application file for complete search history.

(56) References Cited

U.S. PATENT DOCUMENTS

| | | | |
|---|---|---|---|
| 5,512,239 A | 4/1996 | Fujiwara et al. | |
| 2012/0085513 A1* | 4/2012 | Oku ..................... | B23K 35/308 165/51 |
| 2013/0074971 A1 | 3/2013 | Sakamoto et al. | |

FOREIGN PATENT DOCUMENTS

| | | |
|---|---|---|
| EP | 0049033 A1 | 4/1982 |
| EP | 1 873 271 A1 | 1/2008 |

(Continued)

OTHER PUBLICATIONS

English Machine Translation of JP 2000144462 A of Kitani et al. (Year: 2000).*
Itoh et al., "New Continuous Descaling Process of Stainless Steel Strip Coils," The Japan Institute of Metals Publication, vol. 31, No. 6, Jan. 30, 1992, pp. 556-558, with a partial English translation (4 pages total).
Japanese Submission of Information, dated Jun. 6, 2017, for counterpart Japanese Application No. 2015-508499, with a partial English translation.

(Continued)

*Primary Examiner* — Jessee R Roe
*Assistant Examiner* — Jophy S. Koshy
(74) *Attorney, Agent, or Firm* — Birch, Stewart, Kolasch & Birch, LLP

(57) ABSTRACT

One aspect of this ferritic stainless steel sheet contains, by mass %, C: 0.03% or less, N: 0.05% or less, Si: 1% or less, Mn: 1.2% or less, Cr: 14% or more and 28% or less, Nb: 8(C+N) or more and 0.8% or less, and Al: 0.1% or less, with a balance being Fe and inevitable impurities, in which a film satisfying Expression 1 is formed in a surface thereof. Expression 1 is $d_f \times Cr_f + 5(Si_f + 3Al_f) \leq 2.0$. In Expression 1, $d_f$ represents a thickness (nm) of the film, $Cr_f$ represents a Cr cationic fraction in the film, $Si_f$ represents a Si cationic fraction in the film, and $Al_f$ represents an Al cationic fraction in the film.

20 Claims, No Drawings

(51) Int. Cl.
*C22C 38/30* (2006.01)
*C22C 38/32* (2006.01)
*C22C 38/42* (2006.01)
*C22C 38/48* (2006.01)
*C22C 38/28* (2006.01)
*C22C 38/44* (2006.01)
*F28F 21/08* (2006.01)
*C21D 6/00* (2006.01)
*B23K 1/00* (2006.01)
*B23K 1/19* (2006.01)
*F28D 21/00* (2006.01)

(56) References Cited

FOREIGN PATENT DOCUMENTS

| JP | 57-60056 A | 4/1982 |
| JP | 62-222100 A | 9/1987 |
| JP | 7-292446 A | 11/1995 |
| JP | 2000-144462 A | 5/2000 |
| JP | 3111853 B2 | 11/2000 |
| JP | 2002-285300 A | 10/2002 |
| JP | 2002-363712 A | 12/2002 |
| JP | 2008-95575 A | 4/2008 |
| JP | 2009-174046 A | 8/2009 |
| JP | 2010-285683 A | 12/2010 |
| JP | 2011-144768 A | 7/2011 |
| JP | 2011-157616 A | 8/2011 |
| JP | 2012-214880 A | 11/2012 |
| JP | 2012-214881 A | 11/2012 |
| JP | 6157664 B1 | 7/2017 |

OTHER PUBLICATIONS

International Preliminary Report on Patentability (Forms PCT/IPEA/409 and PCT/IPEA/416) dated Dec. 16, 2014, for International Application No. PCT/JP2014/058112 with the English translation.
International Search Report (Form PCT/ISA/210) dated Jun. 3, 2014, for International Application No. PCT/JP2014/058112 with the English translation.
Mizoguchi et al., "Effect of Chemical Composition of Ferritic Stainless Steels on Nickel Brazability," CAMP-ISIJ, The Iron and Steel Institute of Japan, Report of the ISIJ Meeting, vol. 24, 2011, p. 977.
Extended European Search Report, dated Mar. 3, 2017, for corresponding European Application No. 14773798.5.
European Office Action for Application No. 14 773 798.5, dated Sep. 6, 2018.
I. M. Bernstein, "Residual and Minor Elements in Stainless Steels", Handbook of Stainless Steels, Jan. 1, 1977, pp. 14-1-14-14, XP002430954.
Japanese Written Opposition to the Grant of Patent for Application No. 2015-508499, dated Aug. 13, 2018, with English language translation.
John F. Moulder et al., Handbook of X-ray Photoelectron Spectroscopy, Perkin-Elmer Corporation, Eden Prairie Minnesota, United States of America.

* cited by examiner

FERRITIC STAINLESS STEEL SHEET HAVING EXCELLENT BRAZABILITY, HEAT EXCHANGER, FERRITIC STAINLESS STEEL SHEET FOR HEAT EXCHANGERS, FERRITIC STAINLESS STEEL, FERRITIC STAINLESS STEEL FOR MEMBERS OF FUEL SUPPLY SYSTEMS, AND MEMBER OF FUEL SUPPLY SYSTEM

TECHNICAL FIELD

The present invention relates to a ferritic stainless steel sheet used as a material for members assembled by brazing, and a heat exchanger and a fuel supply system part using the same.

The present application claims priority on Japanese Patent Application No. 2013-071740 filed on Mar. 29, 2013, and Japanese Patent Application No. 2013-148951 filed on Jul. 17, 2013, the contents of which are incorporated herein by reference.

BACKGROUND ART

In recent years, in the automotive field, due to the growing awareness of environmental issues, exhaust gas regulations have become more stringent and countermeasures have been underway to suppress carbon dioxide gas exhaust. In addition to countermeasures on fuel such as bioethanol or biodiesel fuel, the countermeasures, such as further weight reduction or the installation of exhaust gas treatment devices such as an Exhaust Gas Recirculation (EGR), a Diesel Particulate Filter (DPF), and a urea Selective Catalytic Reduction (SCR) system, have been in practice. Further, in order to improve fuel efficiency, an exhaust heat recovery device which thermally recovers exhaust heat has also come to be mounted.

In the EGR cooler, exhaust gas from an engine is cooled by using engine cooling water and then the exhaust gas is returned to an intake side and is combusted again. Thus, the combustion temperature is lowered and an amount of $NO_x$ which is a poisonous gas is reduced. In addition, the exhaust heat recovery device is a system where exhaust gas heats engine cooling water and the heated engine cooling water is used for a heater or the warm-up of an engine, and is also called as an exhaust heat recirculation system. Accordingly, the exhaust heat recovery device shortens a time from cold start to engine stop in hybrid vehicles, and contributes to improvement in fuel efficiency particularly in the winter.

Further, in the field of water heaters (hot water supplies), with the spread of eco-friendly devices, heat exchangers have been widely applied. In a hot water supply by gas, a latent heat recovery type hot water supply by gas has become widespread which further includes a stainless steel secondary heat exchanger so as to recover latent heat from a high temperature exhaust gas of approximately 150° C. to 200° C. which was exhausted without recovering in the hot water supply by gas of the related art. Further, a hot water supply by electricity of the related art included a heater. However, the hot water supply by electricity has been changed to a $CO_2$ refrigerant heat pump type hot water supply, which is commonly known as EcoCute (registered trademark), capable of reducing electrical energy to ⅓ or lower and in the $CO_2$ refrigerant heat pump type hot water supply, a heat exchanger is also used.

Such a heat exchanger is required to have a good thermal conductivity to obtain good thermal efficiency. In addition, since the heat exchanger is in contact with exhaust gas, the heat exchanger is required to have excellent corrosion resistance to exhaust gas condensate water. In the case of automobile parts, an EGR cooler or an exhaust heat recovery device which has a possibility that corrosion may cause a serious accident such as the leakage of cooling water is required to have greater safety and further excellent corrosion resistance. In addition, since the structure of a heat exchange section is complicated, the heat exchange section is assembled not only by welding but also by brazing. The material for the heat exchange section assembled by brazing is required to have good brazeability.

As the material used for a heat exchanger, generally, austenitic stainless steel such as SUS304 and SUS316L is used. However, from the viewpoint of thermal conductivity, intergranular corrosion resistance and stress corrosion cracking resistance, ferritic stainless steel has attracted attention.

In Patent Document 1, a ferritic stainless steel is disclosed which includes C: 0.01% or less, Cr: 10.5% to 13.5%, N: 0.05% or less, and at least one of Ti, Nb and Ta and is easily brazed by a brazing filler material. Here, wettability is affected by the amount of Ti and thus the amount of Ti is limited to 0.12% or less. From the viewpoint of brazing, it is desirable not to add Ti.

In Patent Document 2, a ferritic stainless steel having excellent brazeability is disclosed which includes C: 0.03% or less, Si: 0.02% to 1.5%, Mn: 0.02% to 2%, Cr: 10% to 22%, Nb: 0.03% to 1%, Al: 0.5% or less, and N: 0.05% or less. In Patent Document 2, brazeability is ensured by limiting the amounts of Ti and Al based on the relational expression of Ti, N and Al.

In Patent Document 3, a ferritic stainless steel for brazing is disclosed which includes C: 0.03% or less, Si: more than 0.1% to 1% or less, Mn: 2% or less, P: 0.05% or less, S: 0.03% or less, Cr: 16% to 25%, Nb: 0.15% to 0.8%, Ti: 0.03% or less, Al: 0.03% or less, and N: 0.03% or less. In Patent Document 3, particularly, brazeability in a hydrogen atmosphere is ensured by more strictly limiting the amount of Al added in addition to Ti.

Since a heat exchanger provided in an EGR cooler or an exhaust heat recovery device is required to have excellent corrosion resistance, a ferritic stainless steel having a large amount of Cr is generally applied. Stainless steel exhibits corrosion resistance by forming a passivation film which is rich in Cr in the surface. As the amount of Cr in the material increases, a film having a higher degree of protection is formed. On the other hand, it is required to temporarily reduce and remove the passivation film at the time of brazing. However, in the related art, there has been no consideration of the reduction properties of a passivation film, which is formed in stainless steel, particularly, stainless steel having a high Cr content.

In addition, in order to cope with exhaust gas regulations and fuel efficiency regulations, which have become tighter every year, countermeasures to cope with the regulations have been made even in the automotive field. As an example, direct engine injection may be mentioned. When direct engine injection is achieved, it is possible to reduce fuel consumption and to improve output at the same time. Also, exhaust gas can be reduced. In addition, due to high compatibility of the direct injection engine with a supercharger, even when the direct engine injection is combined with a downsized engine, power performance can be maintained.

In the direct injection engine, fuel discharged from a fuel tank is pressurized by a pump and supplied to the engine through a delivery pipe or the like. Since the pressurized fuel is intermittently injected into the engine, the pressure of the fuel is easily changed. Therefore, a pressure adjusting part is required in some cases. Since a fuel supply system part such as a pressure adjusting part is disposed in the proximity of the engine, the temperature of the part is easily increased. Therefore, the material used for the fuel supply system part is required to have strength. In order to ensure strength, it is considered to increase the thickness of the material. However, when the thickness of the material is increased, the weight of the material is also increased, which leads to an increase in fuel consumption.

On the other hand, from the viewpoint of suppressing carbon dioxide gas exhaust, biofuels such as bioethanol and biodiesel fuel have been widely used. For example, bioethanol which is included in biofuel is a factor which causes aluminum to be corroded. Accordingly, the material used for the fuel supply system part is required to have good corrosion resistance to biofuel. From the viewpoint of the above-described strength and corrosion resistance, stainless steel has attracted attention as the material for the fuel supply system part.

In addition, most fuel supply system parts such as a delivery pipe and the like have complicated structures. Therefore, members are assembled by brazing in many cases. Accordingly, the material used for the fuel supply system part is required to have not only good strength and corrosion resistance but also good brazeability.

In Patent Document 4, a fuel supply apparatus is disclosed which is capable of damping fuel pressure pulsation in a delivery pipe from low fuel pressure operation time to high fuel pressure operation time. In Patent Document 4, it is disclosed that stainless steel can be used for a pulsation damping pipe. However, the details of the stainless steel material used are not described.

In Patent Document 5, a high pressure fuel delivery pipe for a direct injection engine is disclosed which is capable of preventing a leakage of a high pressure fuel from a joint surface between a mounting stay and a body pipe and improving bonding strength of the mounting stay. It is disclosed that this delivery pipe is produced by brazing stainless steel. However, in Patent Document 5, the details of the stainless steel used are not described.

In Patent Document 6, a ferritic stainless steel sheet is disclosed which contains, by mass %, C: ≤0.01%, Si: ≤1.0%, Mn: ≤1.5%, P: ≤0.06%, S: ≤0.03%, Cr: 11% to 23%, Ni: ≤2.0%, Mo: 0.5% to 3.0%, Al: ≤1.0%, and N: ≤0.04% so as to satisfy a relational expression of Cr+3.3Mo≥18, and further contains either one or both of Nb: ≤0.8% and Ti: ≤1.0% so as to satisfy a relational expression of 18≤Nb/(C+N)+2Ti/(C+N)≤60, in which the grain size number of ferrite grains is 6.0 or more and the average r value is 2.0 or more.

In Patent Document 7, a ferritic stainless steel sheet is disclosed which contains, by mass %, C: ≤0.01%, Si: ≤1.0%, Mn: ≤1.5%, P: ≤0.06%, S: ≤0.03%, Al: ≤1.0%, Cr: 11% to 20%, Ni: ≤2.0%, Mo: 0.5% to 3.0%, V: 0.02% to 1.0%, and N: ≤0.04%, and further contains either one or both of Nb: 0.01% to 0.8% and Ti: 0.01% to 1.0%, in which the height of an undulation generated on the surface of the steel sheet is 50 μm or less when the steel sheet is subjected to a uniaxial tension and deformed by 25%. The technologies in both Patent Documents 6 and 7 deal with corrosion resistance to typical gasoline and there is no description of corrosion resistance to biofuel.

A material used for an automotive fuel supply system part, particularly, a direct injection engine fuel supply system part is required to mainly have strength, corrosion resistance and brazeability. Stainless steel exhibits corrosion resistance by forming a passivation film which is rich in Cr in the surface and as the Cr content in the material increases, a film having a higher degree of protection is formed. Thus, excellent corrosion resistance is exhibited. On the other hand, at the time of brazing of stainless steel, it is required to temporarily reduce and remove this passivation film. However, in the related art, there has been no consideration of the reduction properties of a passivation film, which is formed in stainless steel, particularly, stainless steel having a high Cr content. In the stainless steel having a high Cr content, the reduction resistance of the passivation film is high. In the related art, stainless steel having both good corrosion resistance and good brazeability has not been suggested.

PRIOR ART DOCUMENTS

Patent Documents

Patent Document 1: Japanese Unexamined Patent Application, First Publication No. 557-60056
Patent Document 2: Japanese Unexamined Patent Application, First Publication No. 2009-174046
Patent Document 3: Japanese Unexamined Patent Application, First Publication No. 2011-157616
Patent Document 4: Japanese Unexamined Patent Application, First Publication No. 2008-95575
Patent Document 5: Japanese Unexamined Patent Application, First Publication No. 2011-144768
Patent Document 6: Japanese Unexamined Patent Application, First Publication No. 2002-285300
Patent Document 7: Japanese Unexamined Patent Application, First Publication No. 2002-363712

DISCLOSURE OF THE INVENTION

Problems to be Solved by the Invention

The present invention has been made in consideration of the above circumstances of the related art.

A first object of the present invention is to provide a ferritic stainless steel sheet having excellent brazeability that can be suitably used as a material of a member, such as a heat exchanger and the like, which is assembled by brazing.

A second object of the present invention is to provide a ferritic stainless steel sheet having excellent brazeability that can be suitably used as a material for a member, such as a fuel supply system part and the like, which is assembled by brazing. In addition, the second object of the present invention is to provide a ferritic stainless steel for fuel supply system members and a fuel supply system part having both good corrosion resistance and good brazeability and also having excellent strength.

Means for Solving the Problem

The features of a first aspect of the present invention to achieve the first object are as follows.

[1] A ferritic stainless steel sheet having excellent brazeability is provided which includes, by mass %: C: 0.03% or less; N: 0.05% or less; Si: 1% or less; Mn: 1.2% or less; Cr: 14% or more and 28% or less; Nb: 8(C+N) or more and 0.8% or less; and Al: 0.1% or less, with a balance being Fe and inevitable impurities, in which a film satisfying Expression 1 is formed in a surface thereof.

$$d_f \times Cr_f + 5(Si_f + 3Al_f) \leq 2.0 \quad \text{(Expression 1)}$$

In Expression 1, $d_f$ represents a thickness of the film in terms of nm, $Cr_f$ represents a Cr cationic fraction in the film, $Si_f$ represents a Si cationic fraction in the film, and $Al_f$ represents an Al cationic fraction in the film.

[2] The ferritic stainless steel sheet having excellent brazeability according to [1] may further include, by mass %, one or two or more selected from Ni: 5% or less, Cu: 1.5% or less, and Mo: 3% or less.

[3] The ferritic stainless steel sheet having excellent brazeability according to [1] or [2] may further include, by mass %, one or two or more selected from V: 0.5% or less, W: 1% or less, B: 0.005% or less, Zr: 0.5% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

[4] A heat exchanger is provided which includes a heat exchange section including a joined member by brazing, in which the member is composed of the ferritic stainless steel sheet according to any one of [1] to [3].

[5] A ferritic stainless steel sheet for heat exchangers is provided which includes, by mass %: C: 0.03% or less; N: 0.05% or less; Si: 1% or less; Mn: 1.2% or less; Cr: 14% or more and 28% or less; Nb: 8(C+N) or more and 0.8% or less; and Al: 0.1% or less, with a balance being Fe and inevitable impurities, in which a film satisfying Expression 1 is formed in a surface thereof.

$$d_f \times Cr_f + 5(Si_f + 3Al_f) \leq 2.0 \quad \text{(Expression 1)}$$

In Expression 1, $d_f$ represents a thickness of the film in terms of nm, $Cr_f$ represents a Cr cationic fraction in the film, $Si_f$ represents a Si cationic fraction in the film, and $Al_f$ represents an Al cationic fraction in the film.

[6] The ferritic stainless steel sheet for heat exchangers according to [5] may further include, by mass %, one or two or more selected from Ni: 5% or less, Cu: 1.5% or less, and Mo: 3% or less.

[7] The ferritic stainless steel sheet for heat exchangers according to [5] or [6] may further include, by mass %, one or two or more selected from V: 0.5% or less, W: 1% or less, B: 0.005% or less, Zr: 0.5% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

The features of a second aspect of the present invention to achieve the second object are as follows.

[8] A ferritic stainless steel is provided which includes, by mass %: C: 0.03% or less; N: 0.05% or less; Si: 1% or less; Mn: 1.2% or less; Cr: 15% or more and 23% or less; Nb: 8(C+N)+0.1% or more and 0.8% or less; and Al: 0.1% or less, with a balance being Fe and inevitable impurities, in which a film satisfying Expressions 2 and 3 is formed in a surface thereof.

$$d_f \times Cr_f + 5(Si_f + 3Al_f) \leq 2.0 \quad \text{(Expression 2)}$$

$$0.18 \leq Cr_f \leq 0.5 \quad \text{(Expression 3)}$$

In Expression 2, $d_f$ represents a thickness of the film in terms of nm, $Si_f$ represents a Si cationic fraction in the film, and $Al_f$ represents an Al cationic fraction in the film. In Expressions 2 and 3, $Cr_f$ represents a Cr cationic fraction in the film.

[9] The ferritic stainless steel according to [8] may further include, by mass %, one or more selected from Ni: 2% or less, Cu: 1.5% or less, and Mo: 3% or less.

[10] The ferritic stainless steel according to [8] or [9] may further include, by mass %, one or more selected from V: 0.5% or less, W: 1% or less, B: 0.005% or less, Zr: 0.5% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

[11] A fuel supply system part is provided which includes a joined member by brazing, in which the member is composed of the ferritic stainless steel according to any one of [8] to [10].

[12] A ferritic stainless steel for fuel supply system parts is provided which includes, by mass %: C: 0.03% or less; N: 0.05% or less; Si: 1% or less; Mn: 1.2% or less; Cr: 15% or more and 23% or less; Nb: 8(C+N)+0.1% or more and 0.8% or less; and Al: 0.1% or less, with a balance being Fe and inevitable impurities, in which a film satisfying Expressions 2 and 3 is formed in a surface thereof.

$$d_f \times Cr_f + 5(Si_f + 3Al_f) \leq 2.0 \quad \text{(Expression 2)}$$

$$0.18 \leq Cr_f \leq 0.5 \quad \text{(Expression 3)}$$

In Expression 2, $d_f$ represents a thickness of the film in terms of nm, $Si_f$ represents a Si cationic fraction in the film, and $Al_f$ represents an Al cationic fraction in the film. In Expressions 2 and 3, $Cr_f$ represents a Cr cationic fraction in the film.

[13] The ferritic stainless steel for fuel supply system parts according to [12] may further include, by mass %, one or two or more selected from Ni: 2% or less, Cu: 1.5% or less, and Mo: 3% or less.

[14] The ferritic stainless steel for fuel supply system parts according to [12] or [13] may further include, by mass %, one or two or more selected from V: 0.5% or less, W: 1% or less, B: 0.005% or less, Zr: 0.5% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

Effects of the Invention

As described above, according to the first aspect of the present invention, it is possible to provide a ferritic stainless steel sheet having excellent brazeability suitably used as a material for a member which is assembled by brazing. The ferritic stainless steel sheet according to the first aspect can be suitably used for automotive parts such as an EGR cooler, an oil cooler, an exhaust heat recovery device, a fuel delivery system part, and the like. In addition, the ferritic stainless steel sheet according to the first aspect can be suitably used for a heat exchanger for a hot water supply such as a secondary heat exchanger of a latent heat recovery type hot water supply operated by gas and a plate type heat exchanger of an EcoCute (registered trademark) operated by electricity. Further, the ferritic stainless steel sheet according to the first aspect can be suitably used for other members of heat exchangers of various plants and the like assembled by brazing.

The ferritic stainless steel, the ferritic stainless steel for fuel supply system parts, and the fuel supply system part according to the second aspect of the present invention have excellent brazeability and excellent corrosion resistance to biofuel and further have excellent strength.

EMBODIMENTS FOR CARRYING OUT THE INVENTION

Hereinafter, embodiments of the present invention will be described in detail.

(First Embodiment)

This embodiment is a ferritic stainless steel sheet used as a material for a member that is subjected to brazing using a Ni brazing filler metal or a Cu brazing filler metal. The brazing is performed at a temperature of 950° C. to 1,200° C. in vacuum atmosphere or hydrogen atmosphere. At this time, an argon gas, nitrogen gas, or the like for atmosphere control or replacement is used in combination therewith in some cases. In the brazing, base materials (materials) are brazed by the brazing filler metal and clearances are filled with the brazing filler metal to join the base materials. When an oxide film is present in the surface of the base material, the base material is not easily brazed and thus brazeability is inhibited.

In the surface of the stainless steel sheet, an (Fe, Cr) oxide film which is rich in Cr is formed and thus excellent corrosion resistance is exhibited. In order to ensure wettability, it is necessary that this film be removed. In order to reduce the film, brazing is performed under the condition of a high degree of vacuum or a low dew point. Specifically, brazing of the stainless steel sheet is performed under the condition of a higher degree of vacuum or a lower dew point than that at which Cr and $Cr_2O_3$ are in equilibrium at a brazing temperature. When the stainless steel sheet is subjected to brazing, typically, the stainless steel is held at the brazing temperature for approximately 10 minutes to 30 minutes. Brazeability is considerably affected by how the film formed in the surface of the stainless steel sheet is reduced within the limited period of time.

In consideration of the circumstances, the inventors have focused on the composition and the thickness of a surface film and conducted intensive study on the brazeability of a ferritic stainless steel sheet.

As a result thereof, it has been found that a film formed in the surface is required to satisfy the following (Expression 1) to obtain a ferritic stainless steel sheet having excellent brazeability.

$$d_f \times Cr_f + 5(Si_f + 3Al_f) \leq 2.0 \quad \text{(Expression 1)}$$

In (Expression 1), $d_f$ represents a thickness (nm) of the film, $Cr_f$ represents a Cr cationic fraction in the film, $Si_f$ represents a Si cationic fraction in the film, and $Al_f$ represents an Al cationic fraction in the film.

(Expression 1) is established based on the following points.

(a) With regard to the (Fe, Cr) oxide film formed in the surface of the stainless steel sheet, the thicker the thickness of the film is and the higher the Cr content in the film is, the more difficult it is to reduce the film.

(b) Typically, Si oxides and Al oxides are not reduced under the brazing conditions, and thus in the case where these oxides are contained in the film, the reducibility of the film is lowered and brazeability is deteriorated.

The Cr cationic fraction in the (Fe, Cr) oxide film formed in the surface of the stainless steel sheet increases as the Cr content contained in the stainless steel sheet increases and is also affected by material production conditions before brazing such as annealing and pickling. On the other hand, the thickness of the oxide film becomes thinner as the Cr content in the stainless steel sheet increases and is also affected by the material production conditions. Accordingly, it is required to ensure brazeability by suppressing growth of the film and decreasing the film thickness in the stainless steel sheet having a higher Cr content.

In general, 1% or less of Si is contained in the stainless steel sheet. In finish annealing and pickling processes, Si is concentrated in the film and remains in the film in the form of Si oxides. Thus, there is a possibility of brazeability being deteriorated. The reason why Si oxides are concentrated in the film in the finish annealing and pickling processes is not clear but is considered as follows at the present moment.

When the stainless steel sheet is subjected to annealing in the atmosphere, Fe-rich (Fe, Cr) oxides are formed in the outer layer and Cr-rich (Fe, Cr) oxides are formed in the inner layer. Then, Si is present in the form of oxides in a portion inner than a portion where the Cr-rich (Fe, Cr) oxides are present. The Si oxides are more easily formed as the Cr-rich (Fe, Cr) oxides are more stabilized. Therefore, as a base material factor, it is assumed that as the Cr content in the stainless steel sheet increases, Si oxides are more easily formed. As a production process factor, it is assumed that as the annealing temperature increases, or the annealing time increases, Si oxides are more easily formed.

The pickling process subsequent to the finish annealing is mainly performed for dissolving and removing the (Fe, Cr) oxides which are formed in the annealing. However, part of the base material of the base is also dissolved. Since the Si oxides are stable in a neutral to weak acidic range, it is effective to remove the Si oxides with the dissolution of the base material or to treat the steel in an alkali capable of dissolving the Si oxides. In order to dissolve and remove the Si oxides together with the base material by pickling, a method of increasing the temperature and the concentration of a pickling solution or a method of increasing the pickling time is considered. Further, in order to dissolve the Si oxides in the alkali, for example, a method of increasing the temperature and increasing the time in a salt method (a method of heating a commercially available descaling alkali salt mainly containing NaOH and immersing steel in the alkali salt) is considered.

As described above, the formation and removal of the Si oxides are affected by the chemical composition of the steel sheet as well as the production conditions such as annealing and pickling. Therefore, in order to ensure brazeability, it is required to prevent the concentration of Si oxides in the film from being increased by appropriately combining the chemical composition with the production conditions.

Al is added as required for deoxidation and the like. However, similar to Si, in the finish annealing and pickling processes, Al is concentrated in the film and remains in the film in the form of Al oxides. Thus, there is a possibility of brazeability being deteriorated. The Al oxides are formed in a portion further inner than a portion where the Si oxides are present, that is, the Al oxides are formed when the Cr-rich (Fe, Cr) oxides are formed more stably. The removal of the Al oxides is basically preformed in the same manner as the removal of the Si oxides. However, since the Al oxides are formed in a portion inner than a portion where the Si oxides are present, it is difficult to remove the Al oxides. Therefore, it is important to suppress the formation of Al oxides and it is assumed that it is effective to lower the annealing temperature and to shorten the annealing time.

As described above, since brazeability is negatively affected by the Si oxides and Al oxides in the film, it is required to keep the Si cationic fraction $Si_f$ and the Al cationic fraction $Al_f$ low in the film.

Both the Si cationic fraction $Si_f$ and the Al cationic fraction $Al_f$ are obtained from the quantitative analysis result of the outermost surface by X-ray photoelectron spectroscopy (XPS). Here, cations are only for metallic elements. The Si cationic fraction $Si_f$ in the film is desirably 0.1 or less and more desirably 0.05 or less. The Al cationic fraction $Al_f$ in the film is desirably 0.05 or less and more desirably 0.02 or less. Both the Si cationic fraction and the Al cationic fraction are most desirably 0 (which is equal to or lower than a detection limit).

In addition, the thickness $d_f$ of the film which negatively affects brazeability is desirably 10 nm or less and more desirably 7 nm or less. Here, $d_f$ can be obtained by an angle resolution method. Specifically, the thickness is measured at output angles of 45 degrees and 90 degrees by X-ray photoelectron spectroscopy (XPS) and the thickness of a Cr—O film is obtained from variations in the Cr peak shape. This is because the oxide film is formed of a mixed oxide of Fe and Cr and Cr is concentrated on the inner layer side of the film.

Typically, when the thickness of the surface film of the stainless steel sheet is defined, the thickness is often defined as a thickness in which the O peak strength in the depth direction analysis is ½ of the maximum strength. However, when Si oxides and Al oxides are included in the film, these oxides are present in a portion inner than the Cr-rich inner layer of the film. Therefore, compared to the case of the thickness of the Cr—O film obtained from variations in the Cr peak shape, the thickness of the film is evaluated to be thick when the thickness of the film is defined as a thickness in which the O peak strength in the depth direction analysis is ½ of the maximum strength. In the embodiment, the relevance between brazeability and the reduction properties of the Cr oxide film is focused on and thus the thickness of the surface film of the stainless steel sheet is set to the thickness of the Cr—O film.

The Cr cationic fraction $Cr_f$ in the film is obtained in the same manner as in the calculation of the Si cationic fraction $Si_f$ and the Al cationic fraction $Al_f$. From the viewpoint of brazeability, $Cr_f$ is desirably set to 0.6 or less. $Cr_f$ is more desirably 0.5 or less.

As describe above, from the viewpoint of brazeability, suitable ranges of the thickness $d_f$ of the film, the Cr cationic fraction $Cr_f$, Si cationic fraction $Si_f$ and Al cationic fraction $Al_f$ in the film are shown. The value of $d_f \times Cr_f + 5(Si_f + 3Al_f)$ to be calculated using these ranges is set to 2.0 or less, preferably set to 1.8 or less, more preferably set to 1.5 or less, and still more preferably set to 1.3 or less. On the other hand, in addition to brazeability, corrosion resistance is also important in the embodiment and is affected by the composition of the oxide film that is formed in the surface. For this reason, the value of $d_f \times Cr_f + 5(Si_f + 3Al_f)$ is preferably set to 0.6 or more and more preferably set to 0.7 or more. Here, from the viewpoint of corrosion resistance, the Cr cationic fraction $Cr_f$ in the film is the most important and the value thereof is preferably set to 0.14 or more.

The embodiment is made in consideration of the above study and is to provide a ferritic stainless steel sheet having excellent brazeability. The features thereof are as described in claims.

Hereinafter, the reason why each composition of the ferritic stainless steel sheet having excellent brazeability is limited will be described. In the following description, unless otherwise particularly stated, a unit "%" indicating the content of each component represents mass %.

(C: 0.03% or less)

Since C deteriorates intergranular corrosion resistance and workability, the content thereof is required to be kept to be small. For this reason, the upper limit of the C content is set to 0.03% or less. However, since the excessive lowering of the C content increases refining costs, the lower limit of the C content is preferably set to 0.002% or more. The upper limit of the C content is preferably 0.02%.

(N: 0.05% or less)

N is a useful element for pitting corrosion resistance. However, N deteriorates intergranular corrosion resistance and workability. Therefore, the N content is required to be kept to be small. For this reason, the upper limit of the N content is set to 0.05% or less. However, since the excessive lowering of the N content increases refining costs, the lower limit of the N content is preferably set to 0.002% or more. The upper limit of the N content is preferably 0.02%. Further, from the viewpoint of suppressing grain coarsening at the time of brazing, the total content of C and N is preferably set to 0.015% or more ((C+N)≥0.015%). In addition, from the viewpoint of intergranular corrosion resistance and workability, the total content of C and N is preferably set to 0.05% or less ((C+N)≤0.05%).

(Si: 1% or less)

Si is concentrated in the surface film of the stainless steel sheet after brazing and thereby, Si contributes to improvement in corrosion resistance thereof. It is preferable to contain more than 0.1% of Si in the steel. In addition, Si is useful as a deoxidation element. However, excessive addition of Si easily forms a film containing Si oxides in the surface of the material before brazing and deteriorates workability. Therefore, the Si content is set to 1% or less, preferably set to 0.5% or less, and more preferably set to 0.4% or less.

(Mn: 1.2% or less)

Mn is useful as a deoxidation element and it is preferable to contain 0.02% or more of Mn in the steel. However, when Mn is excessively included, corrosion resistance is deteriorated. Therefore, the Mn content is set to 1.2% or less, preferably set to 1% or less, and more preferably set to 0.5% or less. The Mn content is preferably 0.05% or more and more preferably 0.1% or less.

(Cr: 14% or more and 28% or less)

Cr is a basic element for ensuring corrosion resistance. In heat exchangers that are intended applications of the embodiment, in many cases, combustion exhaust gas flows in the passage, cooled by cooling water or the like, and condensed to produce corrosive condensate water. Therefore, steel sheets used for the heat exchangers are required to have corrosion resistance to exhaust gas condensate water. In addition, in the case of heat exchangers used outdoors, the heat exchangers are required to have corrosion resistance to salt damage from the outer surface. For this reason, the Cr content is required to set to be at least 14% or more. As the Cr content increases, corrosion resistance can increase. However, since Cr deteriorates workability and manufacturability, the amount of Cr is set to 28% or less. The Cr content is preferably 16% or more and more preferably 17% or more. In addition, the Cr content is preferably 23% or less and more preferably 20.5% or less.

(Nb: 8(C+N) or more and 0.8% or less)

Since Nb is a useful element to fix C and N and to improve intergranular corrosion resistance in welded zones, the amount of Nb is required to become eight times or more the amount of (C+N). In addition, Nb improves high temperature strength. In heat exchangers that are intended applications of the embodiment, a member in which high temperature gas flows is included. However, from the viewpoint of strength and thermal fatigue properties, the use of Nb is effective. For this reason, it is effective to include Nb in a solid solution state and the Nb content is preferably set to 8(C+N)+0.03% or more. However, since excessive addition of Nb deteriorates workability and manufacturability, the upper limit of the Nb content is 0.8% and preferably 0.6%.

(Al: 0.1% or less)

Since Al has a deoxidation effect or the like, Al is a useful element for refining and also has an effect of improving formability. Therefore, it is preferable to contain 0.002% or more of Al. However, excessive addition of Al easily forms a film including Al oxides in the surface of the material before brazing and deteriorates toughness. Therefore, the Al content is set to 0.1% or less, preferably set to 0.08% or less, more preferably set to 0.05% or less, and still more preferably set to 0.03% or less.

The ferritic stainless steel sheet of the embodiment may further contain, by mass %, one or more selected from Ni: 5% or less, Cu: 1.5% or less, and Mo: 3% or less.

(Ni: 5% or less)

As required, 5% or less of Ni may be contained to improve corrosion resistance. Particularly, in regard to corrosion resistance to exhaust gas condensate water and corrosion resistance to salt damage from the outer surface, which are required for heat exchangers that are intended applications of the embodiment, Ni has an effect of improving penetration resistance. In addition, Ni also has an effect of improving toughness. However, excessive addition of Ni deteriorates workability. Also, since Ni is expensive, the excessive addition of Ni increases costs. In order to obtain the above-described effects, the Ni content is preferably 0.1% or more, more preferably 0.2% or more, and still more preferably 0.3% or more. In addition, the upper limit of the Ni content is 5%, preferably 3%, and more preferably 1.2%.

(Cu: 1.5% or less)

As required, 1.5% or less of Cu may be contained to improve corrosion resistance. Particularly, in regard to corrosion resistance to exhaust gas condensate water and corrosion resistance to salt damage from the outer surface, which are required for heat exchangers that are intended applications of the embodiment, Cu has an effect of improving penetration resistance similar to Ni. However, excessive addition of Cu deteriorates workability. In order to obtain the above-described effects, the Cu content is preferably 0.1% or more and more preferably 0.2% or more. Further, the upper limit of the Cu content is 1.5% and preferably 1%.

(Mo: 3% or less)

As required, 3% or less of Mo may be contained to improve corrosion resistance. Particularly, in regard to corrosion resistance to exhaust gas condensate water and corrosion resistance to salt damage from the outer surface, which are required for heat exchangers that are intended applications of the embodiment, Mo has an effect of improving rusting resistance and penetration resistance. However, excessive addition of Mo deteriorates workability. Also, since Mo is expensive, the excessive addition of Mo increases costs. In order to obtain the effect, the Mo content is preferably 0.1% or more and more preferably 0.3% or more. In addition, the upper limit of the Cu content is 3% and preferably 2%.

The ferritic stainless steel sheet of the embodiment may further contain, by mass %, one or more selected from V: 0.5% or less, W: 1% or less, B: 0.005% or less, Zr: 0.5% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

(V: 0.5% or less)

As required, 0.5% or less of V may be contained to improve corrosion resistance. Excessive addition of V deteriorates workability. Also, since V is expensive, the excessive addition of V increases costs. The V content is preferably 0.5% or less and more preferably 0.3% or less. In addition, in order to obtain the above-described effects, the V content is preferably 0.05% or more and more preferably 0.1% or more.

(W: 1% or less)

As required, 1% or less of W may be contained to improve corrosion resistance. Particularly, in regard to corrosion resistance to exhaust gas condensate water and corrosion resistance to salt damage from the outer surface, which are required for heat exchangers that are intended applications of the embodiment, W has an effect of improving rusting resistance and penetration resistance. However, excessive addition of W deteriorates workability. Also, since W is expensive, the excessive addition of W increases costs. In order to obtain the effect, the W content is preferably 0.2% or more and more preferably 0.4% or more. In addition, the upper limit of the W content is 1% and preferably 0.8%.

(B: 0.005% or less)

As required, B may be contained to improve workability, particularly, secondary workability. Excessive addition of B deteriorates intergranular corrosion resistance. Thus, it is preferable to contain 0.005% or less of B. In order to obtain the effect, the B content is preferably 0.0002% or more and more preferably 0.0004% or more. In addition, the upper limit of the B content is 0.005% and preferably 0.002%.

(Zr: 0.5% or less)

As required, Zr may be contained to improve corrosion resistance, particularly, intergranular corrosion resistance. Excessive addition of Zr deteriorates workability. Also, since Zr is expensive, the excessive addition of Zr increases costs. Therefore, the Zr content is preferably 0.5% or less and more preferably 0.3% or less. In addition, in order to obtain the effect, the Zr content is preferably 0.05% or more and more preferably 0.1% or more.

(Sn: 0.5% or less)

As required, 0.5% or less of Sn may be contained to improve corrosion resistance. Particularly, in regard to corrosion resistance to exhaust gas condensate water and corrosion resistance to salt damage from the outer surface, which are required for heat exchangers that are intended applications of the embodiment, Sn has an effect of improving penetration resistance. However, excessive addition of Sn deteriorates toughness. In order to obtain the effect, the Sn content is preferably 0.02% or more and more preferably 0.05% or more. In addition, the upper limit of the Sn content is 0.5% and preferably 0.3%.

(Co: 0.2% or less)

As required, Co may be contained to improve secondary workability and toughness. Excessive addition of Co increases costs. Thus, the Co content is preferably 0.2% or less and more preferably 0.15% or less. In order to obtain the effect, the Co content is preferably 0.02% or more and more preferably 0.05% or more.

(Mg: 0.002% or less)

Since Mg has a deoxidation effect or the like, Mg is a useful element for refining. Also, Mg has an effect of improving workability and toughness by refining the structure. Therefore, as required, 0.002% or less of Mg may be contained. In order to obtain the effects, the Mg content is preferably 0.0002% or more and more preferably 0.0005% or more. In addition, the upper limit of the Mg content is 0.002% and preferably 0.0015%.

(Ca: 0.002% or less)

Since Ca has a deoxidation effect or the like, Ca is a useful element for refining and 0.002% or less of Ca may be contained as required. In order to obtain the effect, the Ca content is preferably 0.0002% or more and more preferably 0.0005% or more. In addition, the upper limit of the Ca content is 0.002% and preferably 0.0015%.

(REM: 0.01% or less)

According to a general definition, REM (rare earth metal elements) is the general term of elements consisting of 2 elements of scandium (Sc) and yttrium (Y) and 15 elements (lanthanoids) from lanthanum (La) to lutetium (Lu). REM may be added alone or a mixture thereof may be added. Since REM has a deoxidation effect or the like, REM is a useful element for refining. As required, REM may be contained at a total content of 0.01% or less. In order to obtain the effect, the REM content is 0.0005% or more and more preferably 0.001% or more. In addition, the upper limit of the REM content is 0.01% and more preferably 0.008%.

(Sb: 0.5% or less)

As required, 0.5% or less of Sb may be contained to improve corrosion resistance. Particularly, in regard to corrosion resistance to exhaust gas condensate water and corrosion resistance to salt damage from the outer surface, which are required for heat exchangers that are intended applications of the embodiment, Sb has an effect of improving penetration resistance. However, excessive addition of Sb deteriorates toughness. In order to obtain the effect, the Sb content is preferably 0.001% or more, more preferably 0.01% or more, and still more preferably 0.05% or more. In addition, the upper limit of the Sb content is 0.5% and preferably 0.3%.

(Ta: 0.5% or less)

As required, 0.5% or less of Ta may be contained to improve corrosion resistance. Particularly, in regard to corrosion resistance to exhaust gas condensate water and corrosion resistance to salt damage from the outer surface, which are required for heat exchangers that are intended applications of the embodiment, Ta has an effect of improving penetration resistance. However, excessive addition of Ta deteriorates toughness. In order to obtain the effect, the Ta content is preferably 0.01% or more, more preferably 0.05% or more, and still more preferably 0.1% or more. In addition, the upper limit of the Ta content is 0.5% and preferably 0.4%.

(Ga: 0.01% or less)

Since Ga forms stable sulfides to improve corrosion resistance and hydrogen embrittlement resistance, 0.01% or less of Ga may be contained as required. In order to obtain the effect, the Ga content is preferably 0.0002% or more and more preferably 0.0005% or more. In addition, the upper limit of the Ga content is 0.01% and preferably 0.005%.

Among inevitable impurities, from the viewpoint of weldability, the amount of P is preferably set to 0.04% or less and more preferably set to 0.035% or less. In addition, from the viewpoint of corrosion resistance, the amount of S is preferably set to 0.02% or less and more preferably set to 0.01% or less.

The stainless steel sheet of the embodiment can be basically produced by a general method of producing a ferritic stainless steel sheet. For example, a molten steel with the above-described chemical composition is produced in a converter or an electric furnace, the molten steel is refined in an AOD furnace, a VOD furnace or the like, and then a slab is produced by a continuous casting method or an ingot-making method. Next, the slab is subjected to processes of hot rolling-annealing of hot-rolled steel sheet-pickling-cold rolling-finish annealing-pickling so as to produce a steel sheet. As required, annealing of a hot-rolled steel sheet may be omitted, and processes of cold rolling-finish annealing-pickling may be repeatedly performed.

Among the processes described herein, in order to obtain the composition of the surface film defined in the embodiment, it is preferable that conditions for finish annealing and pickling are taken into consideration. Particularly, in the finish annealing process and the pickling process, it is preferable that Si oxides and Al oxides which deteriorate brazeability are inhibited from being formed.

In the embodiment, the pickling process may be performed by combining a plurality of processes. Specifically, a salt method or a neutral salt electrolysis method is performed as a first process, and nitric acid electrolysis is performed as a second process. Immersion in nitric hydrofluoric acid is included as a third process in some cases. Further, as the second process, immersion in nitric hydrofluoric acid may be performed.

As described above, in the pickling process, the salt method is particularly useful for removing Si oxides and it is more effective to increase temperature and increase time. Of these, in the case where the same equipment is used, an increased time lowers a line speed. This leads to a decrease in the temperature of the material before immersion in a salt tank and also leads to deterioration in productivity.

In regard to the temperature in the salt method, since it is known that salt deterioration occurs at a temperature of 530° C. or higher, typically, the steel sheet is immersed in the salt having a temperature of approximately 450° C. to 480° C. However, the temperature in the salt method is set to be higher in the embodiment compared to a typical case. Specifically, the temperature of the salt is preferably set to 490° C. or higher and is effective to set to be 500° C. or higher. The steel sheet is desirably immersed in the salt at a temperature of 500° C. to 530° C.

The immersion time is desirably set to 2 seconds or more and set to 10 seconds or less. However, an increase in the salt temperature easily causes deterioration in surface properties and the surface properties of a stainless steel sheet having a higher Cr content are more easily deteriorated. Therefore, it is desirable that the temperature and immersion time satisfy $T \times (10t+2[Cr])/100 \leq 600$ (here, T represents temperature (° C.), t represents time (sec), and [Cr] represents a Cr content (mass %)).

As described above, the salt method is the most useful for suppressing concentration of Si oxides. However, in order to suppress the amount of generated scales including Si oxides, it is desirable that the finish annealing temperature is lowered. Generally, the finish annealing temperature is selected according to the chemical composition of the material, required mechanical properties, and the like. In the embodiment, in order to obtain desired mechanical properties, it is effective and desirable to lower the finish annealing temperature by 5° C. to 20° C. lower than a typical finish annealing temperature. Specifically, the finish annealing temperature is desirably set to 1,000° C. or lower and more desirably set to 970° C. to 990° C. The lower limit temperature of the finish annealing temperature may be a temperature at which a cold-rolled sheet is subjected to finish annealing to have a metallographic structure having a recrystallization structure and desirable mechanical properties are provided.

Next, a heat exchanger of the embodiment will be described.

The heat exchanger of the embodiment includes a heat exchange section and a case which covers the outside thereof. The heat exchange section is prepared by assembling members. The members are members obtained by forming the ferritic stainless steel sheet of the embodiment into various shapes such as a rectangular shape, a tubular shape, a wavy shape, and the like. In the heat exchange section, a passage for exhaust gas and a passage for cooling water are separately disposed. Outside the heat exchanger, inlets and outlets of a tube in which exhaust gas flows and a tube in which cooling water flows are respectively disposed. In the heat exchanger of the embodiment, a large number of members constitute the heat exchange section and the members have complicated shapes. Most of the members are joined by brazing. As a brazing filler material used for brazing, it is preferable to use a Cu brazing filler metal and/or a Ni brazing filler metal. In regard to the Ni brazing filler metal, it is preferable to use a Ni alloy brazing filler metal containing Cr and Si.

(Second Embodiment)

First, brazeability will be described. In the embodiment, the brazing of a member composed of stainless steel using a Ni brazing filler metal or a Cu brazing filler metal is treated. In brazing, members are brazed by a brazing filler metal and clearances are filled with the brazing filler metal to join the members. When an oxide film is present in the surface of the stainless steel constituting a member to be brazed, the member is not easily brazed and brazeability is inhibited.

An (Fe, Cr) oxide film (passivation film) which is rich in Cr is formed in the surface of the stainless steel and excellent corrosion resistance can be exhibited due to the oxide film. In order to ensure the wettability of the stainless steel, it is required to reduce and remove the oxide film at the time of brazing. When the stainless steel sheet is subjected to brazing, typically, the steel sheet is maintained at the brazing temperature for 10 minutes to 30 minutes. Brazeability is greatly affected by how the film which is formed in the surface of the stainless steel is reduced within the limited period of time.

In consideration of such circumstances, the inventors have focused on the composition and the thickness of the film in the surface and conducted intensive study on the brazeability of ferritic stainless steel.

As a result, it has been found that in order to obtain brazeability, the film formed in the surface is required to satisfy the following (Expression 2) and the Cr cationic fraction in the film is required to be 0.5 or less.

$$d_f \times Cr_f + 5(Si_f + 3Al_f) \leq 2.0 \quad \text{(Expression 2)}$$

In (Expression 2), $d_f$ represents the thickness (nm) of the film, $Cr_f$ represents a Cr cationic fraction in the film, $Si_f$ represents a Si cationic fraction in the film, and $Al_f$ represents an Al cationic fraction in the film.

(Expression 2) is established based on the following points.

(c) With regard to the (Fe, Cr) oxide film which is formed in the surface of the stainless steel, the thicker the thickness $d_f$ of the film is and the higher the Cr content in the film is, the more difficult the film is be reduced.

(d) In the case where Si oxides and Al oxides which are not reduced under typical brazing conditions are included in the oxide film, the reducibility of the film is lowered and brazeability is deteriorated.

The Cr cationic fraction $Cr_f$ in the (Fe, Cr) oxide film formed in the surface increases as the Cr content in the stainless steel increases and is affected by material production conditions before brazing such as annealing and pickling. On the other hand, the thickness of the oxide film becomes thinner as the Cr content in the stainless steel increases and is also affected by the material production conditions. Accordingly, as the Cr content in the stainless steel increases, it is required to suppress the growth of the oxide film and to decrease the thickness of the film so as to satisfy the above (Expression 2) for the purpose of ensuring brazeability.

1% or less of Si is contained in the stainless steel. Si is concentrated in the film in finish annealing and pickling processes and Si remains in the form of Si oxides in the film. Thus, there is a possibility of brazeability being deteriorated.

Although the reason why Si oxides are concentrated in the film in the finish annealing and pickling processes is not clear, the reason can be considered as follows at the present moment.

When stainless steel is subjected to annealing in the atmosphere, Fe-rich (Fe, Cr) oxides are formed in the outer layer and Cr-rich (Fe, Cr) oxides are formed in the inner layer. Then, Si is present in the form of oxides in a portion inner than the inner layer where the Cr-rich (Fe, Cr) oxides are present. The Si oxides are more easily formed as the Cr-rich (Fe, Cr) oxides are more stabilized. Therefore, as a base material factor, it is assumed that as the Cr content in the stainless steel increases, Si oxides are more easily formed. In addition, as a production process factor, it is assumed that as the annealing temperature increases, or the annealing time increases, Si oxides are more easily formed.

The pickling process subsequent to the finish annealing is mainly performed for dissolving and removing the (Fe, Cr) oxides which are formed in the annealing. However, a part of the base material of the base is also dissolved at the same time. Since the Si oxides are stable in a neutral to weak acidic range, it is effective to remove the Si oxides a with the dissolution of the base material or to treat the steel in an alkali capable of dissolving the Si oxides. In order to dissolve and remove the Si oxides together with the base material by pickling, it can be considered to increase the temperature and the concentration of a pickling solution or increase the pickling time. Further, in order to dissolve the Si oxides in the alkali, for example, it can be considered to increase the temperature and increase the time by a salt method (a method of heating a commercially available descaling alkali salt mainly containing NaOH and immersing steel in the alkali salt).

As described above, the formation and removal of the Si oxides are affected by the chemical composition of the steel sheet as well as the production conditions such as annealing and pickling. Therefore, in order to ensure brazeability, it is preferable to prevent the concentration of Si oxides in the film from being increased by appropriately combining the chemical composition with the production conditions.

Al is added for deoxidation or the like. Similar to Si, in the finish annealing and pickling processes, Al is concentrated in the film and remains in the film in the form of Al oxides. Thus, there is a possibility of brazeability being deteriorated. The Al oxides are formed in a portion further inner than a portion where the Si oxides are present, that is, the Al oxides are formed when the Cr-rich (Fe, Cr) oxides are formed more stably. A method of removing Al oxides is basically the same as the above-described method of removing Si oxides. However, since the Al oxides are formed in a portion inner than a portion where the Si oxides are present, it is difficult to remove the Al oxides. Therefore, it is important to suppress the formation of Al oxides and it is assumed that it is effective to lower the annealing temperature and to shorten the annealing time.

As described above, brazeability is negatively affected by Si oxides and Al oxides in the film which is formed in the surface of the stainless steel. Accordingly, it is required to keep the Si cationic fraction $Si_f$ and the Al cationic fraction $Al_f$ low in the film.

Both the Si cationic fraction $Si_f$ and the Al cationic fraction $Al_f$ are obtained from the quantitative analysis result of the outermost surface by X-ray photoelectron spectroscopy (XPS). Here, cations are only for metallic elements. The Si cationic fraction $Si_f$ in the film is desirably 0.1 or less and more desirably 0.05 or less. The Al cationic fraction $Al_f$ in the film is desirably 0.05 or less and more desirably 0.02 or less. Both the Si cationic fraction and the Al cationic fraction are most desirably 0 (which is equal to or lower than a detection limit).

In addition, the thickness $d_f$ of the film which negatively affects brazeability is desirably 10 nm or less and more desirably 7 nm or less. Here, $d_f$ can be obtained by an angle resolution method. Specifically, the thickness is measured at output angles of 45 degrees and 90 degrees by X-ray photoelectron spectroscopy (XPS) and the thickness of a Cr—O film is obtained from variations in the Cr peak shape. This is because the oxide film is formed of a mixed oxide of Fe and Cr and Cr is concentrated on the inner layer side of the film.

Typically, when the thickness of the film in the surface of the stainless steel sheet is defined, the thickness is defined as a thickness in which the O peak strength in the depth direction analysis is ½ of the maximum strength. However, when Si oxides and Al oxides are included in the film, these oxides are present in a portion inner than the inner layer composed of Cr-rich (Fe, Cr) oxides. Therefore, compared to the case of the thickness of the Cr—O film obtained from variations in the Cr peak shape, the thickness of the film is evaluated to be thick when the thickness of the film is defined as a thickness in which the O peak strength in the depth direction analysis is ½ of the maximum strength. In the embodiment, the relevance between brazeability of the stainless steel and the reduction properties of the Cr oxide film is focused on and thus the thickness of the film formed in the surface is set to the thickness of the Cr—O film.

The Cr cationic fraction $Cr_f$ in the film is obtained in the same manner as in the calculation of the Si cationic fraction $Si_f$ and the Al cationic fraction $Al_f$. From the viewpoint of brazeability, $Cr_f$ is set to 0.5 or less. $Cr_f$ is desirably set to 0.45 or less and more desirably set to 0.4 or less.

In the above description, from the viewpoint of brazeability, appropriate ranges of the upper limit of the Cr cationic fraction $Cr_f$ in the film, the thickness $d_f$ of the film, the Si cationic fraction $Si_f$, and the Al cationic fraction $Al_f$ are shown.

The value of $d_f \times Cr_f + 5(Si_f + 3Al_f)$ is set to 2.0 or less as shown in (Expression 2), preferably set to 1.8 or less, more preferably set to 1.5 or less, and still more preferably set to 1.3 or less.

Next, corrosion resistance will be described. The inventors have collected biofuels such as bioethanol and biodiesel fuel and have conducted study and analysis on oxidation degradation behavior of the fuel, corrosiveness thereof to stainless steel, and the like in detail in comparison to typical gasoline. As a result, it has been found that fatty acids in the degraded biofuel by oxidation are distributed to an aqueous phase to exhibit corrosiveness and when corrosiveness is converted into the concentration of organic acids, the converted value corresponds to approximately 100 times the concentration in the case of gasoline.

In addition, the temperatures of fuel injection system parts in the proximity of an engine are increased to a temperature of approximately 90° C. to 100° C., fatty acids become easily distributed from biofuel to an aqueous phase along with the temperature increase, and thus corrosion environment becomes severe. The corrosion environment is severe compared to a corrosion test (at a temperature of 40° C. to 50° C.) using degraded gasoline by oxidation. Further, bioethanol of biofuels moves to an aqueous phase to enlarge the portion of the aqueous phase and, in particular, becomes a factor which inhibits stainless steel from maintaining a passivation.

Accordingly, even in the case of the same fuel supply system parts, fuel supply system parts where the use of biofuel is taken into consideration and which are disposed in the proximity of an engine are required to have more excellent corrosion resistance compared to a fuel supply tube and a fuel tank for using typical gasoline.

Therefore, the inventors have intensively investigated the corrosion resistance of stainless steel in a high-temperature acidic fatty acid environment. As a result, it has been found that it is required to set the amount of Cr of the base material to be 15% or more and to set the Cr cationic fraction $Cr_f$ in the film to be 0.18 or more. In order to obtain stabler corrosion resistance, it is desirable to set the amount of Cr in the base material to be 17% or more and to set the Cr cationic fraction $Cr_f$ contained in the film to be 0.20 or more.

The embodiment is to provide a ferritic stainless steel for fuel supply system parts where strength is taken into consideration with the above-described findings and the features thereof are as described in claims.

Hereinafter, the reason why each composition of the ferritic stainless steel for fuel supply system parts is limited will be described. In the following description, unless otherwise particularly stated, a unit "%" indicating the content of each component represents mass %.

(C: 0.03% or less)

Since C deteriorates intergranular corrosion resistance and workability, the content thereof is required to be kept small. For this reason, the upper limit of the C content is set to 0.03% or less and preferably set to 0.02% or less. However, the excessive lowering of the C content increases refining costs without obtaining required strength. Therefore, the lower limit of the C content is preferably set to 0.002% or more and more preferably set to 0.003% or more.

(N: 0.05% or less)

N is a useful element for pitting corrosion resistance. However, N deteriorates intergranular corrosion resistance and workability. Therefore, the N content is required to be kept to be small. For this reason, the upper limit of the N content is set to 0.05% or less and preferably set to 0.02% or less. However, the excessive lowering of the N content increases refining costs without obtaining required strength. Therefore, the lower limit of the N content is preferably set to 0.002% or more and more preferably set to 0.003% or more.

Further, from the viewpoint of suppressing grain coarsening at the time of brazing, the total content of C and N is preferably set to 0.015% or more ((C+N)≥0.015%). In addition, from the viewpoint of intergranular corrosion resistance and workability, the total content of C and N is preferably set to 0.05% or less ((C+N)≤0.05%).

(Si: 1% or less)

Si easily forms a film containing Si oxides in the surface of the material before brazing and deteriorates workability. Therefore, the Si content is set to 1% or less, more preferably set to 0.5% or less, and more preferably set to 0.4% or less. Si is concentrated in the surface film of the stainless steel after brazing and contributes to improving corrosion resistance. Also, Si is useful as a deoxidation element. Thus, the amount of Si is preferably 0.1% or more and more preferably more than 0.1%.

(Mn: 1.2% or less)

Mn deteriorates corrosion resistance. Therefore, the Mn content is set to 1.2% or less, preferably set to 1% or less, and more preferably set to 0.5% or less. Mn is useful as a deoxidation element and at least 0.02% or more of Mn is preferably contained. The amount of Mn is more preferably 0.05% or more and still more preferably 0.1% or more.

(Cr: 15% or more and 23% or less)

Cr is a basic element to ensure corrosion resistance to biofuel. At least 15% or more of Cr is required to be contained and the amount of Cr is preferably 17% or more. As the Cr content increases, corrosion resistance can be further improved. However, excessive addition of Cr deteriorates workability and manufacturability. Therefore, the Cr content is set to 23% or less and preferably set to 20.5% or less.

(Nb: 8(C+N)+0.1% or more and 0.8% or less)

Nb is a useful element to fix C and N and to improve intergranular corrosion resistance in welded zones. Therefore, the amount of Nb is required to become eight times or more the amount of (C+N). In addition, since Nb has an effect of greatly improving strength in a solid solution state, Nb improves strength and fatigue properties. For this reason, it is effective to include Nb in a solid solution state. Accordingly, it is required to contain 8(C+N)+0.1% or more of Nb and the amount of Nb is preferably set to 8(C+N)+0.2% or more. However, since excessive addition of Nb deteriorates workability and manufacturability. Thus, the upper limit of the Nb content is set to 0.8% and preferably set to 0.6% or less.

(Al: 0.1% or less)

Al easily forms a film containing Al oxides in the surface of the material before brazing and also deteriorates toughness. Therefore, the Al content is set to 0.1% or less, preferably set to 0.08% or less, more preferably set to 0.05% or less, and still more preferably set to 0.03% or less. Since Al has a deoxidation effect or the like, Al is a useful element for refining and has an effect of improving formability. Therefore, the amount of Al is preferably 0.002% or more and more preferably 0.003% or more.

The stainless steel of the embodiment may further contain, by mass %, one or more selected from Ni: 2% or less, Cu: 1.5% or less, and Mo: 3% or less.

(Ni: 2% or less)

As required, 2% or less of Ni may be contained to improve corrosion resistance. Particularly, Ni has an effect of improving corrosion resistance to salt damage from the outer surface, which is required for the fuel supply system part that is an intended application of the embodiment. In addition, Ni has an effect of improving strength. Therefore, when Ni is present, the amount of Ni is preferably 0.1% or more, more preferably 0.2% or more, and still more preferably 0.3% or more. However, excessive addition of Ni deteriorates workability. Also, since Ni is expensive, the excessive addition of Ni increases costs. Therefore, the Ni content is preferably 1.5% or less and more preferably 1.2% or less.

(Cu: 1.5% or less)

As required, 1.5% or less of Cu may be contained to improve corrosion resistance. Particularly, similar to Ni, Cu has an effect of improving corrosion resistance to salt damage from the outer surface, which is required for the fuel supply system part that is an intended application of the embodiment. In addition, Cu has an effect of improving strength. Therefore, when Cu is present, the amount of Cu is preferably 0.1% or more, more preferably 0.2% or more, and still more preferably 0.3% or more. However, excessive addition of Cu deteriorates workability. Accordingly, the Cu content is preferably 1% or less and more preferably 0.8% or less.

(Mo: 3% or less)

Since Mo improves corrosion resistance, 3% or less of Mo may be contained as required. Particularly, Mo has an effect of improving corrosion resistance to biofuels and corrosion resistance to salt damage from the outer surface, which is required for the fuel supply system part that is an intended application of the embodiment. In addition, Mo also has an effect of improving strength. Therefore, when Mo is present, the amount of Mo is preferably 0.1% or more, more preferably 0.3% or more, and still more preferably 0.7% or more. However, excessive addition of Mo deteriorates workability. Since Mo is expensive, the excessive addition of Mo increases costs. Accordingly, the Mo content is preferably 2.2% or less and more preferably 2% or less.

The ferritic stainless steel of the embodiment may further contain, by mass %, one or more selected from V: 0.5% or less, W: 1% or less, B: 0.005% or less, Zr: 0.5% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

(V: 0.5% or less)

As required, 0.5% or less of V may be contained to improve corrosion resistance. In order to stably obtain the effect due to V, the amount of V is preferably 0.05% or more and more preferably 0.1% or more. However, excessive addition of V deteriorates workability. Also, since V is expensive, the excessive addition of V increases costs. Therefore, the V content is preferably 0.3% or less.

(W: 1% or less)

As required, 1% or less of W may be contained to improve corrosion resistance. Particularly, W has an effect of improving corrosion resistance to salt damage from the outer surface, which is required for heat exchangers that are intended applications of the embodiment. In order to stably obtain the effect due to W, the amount of W is preferably 0.2% or more and more preferably 0.5% or more. Excessive addition of W deteriorates workability. Also, since W is expensive, the excessive addition of W increases costs. Therefore, the W content is preferably 0.8% or less.

(B: 0.005% or less)

As required, 0.005% or less of B may be contained to improve workability, particularly, secondary workability. In order to stably obtain the effect due to B, the amount of B is preferably 0.0002% or more and more preferably 0.0003% or more. Excessive addition of B deteriorates intergranular corrosion resistance. Therefore, the B content is preferably 0.0015% or less.

(Zr: 0.5% or less)

As required, 0.5% or less of Zr may be contained to improve corrosion resistance, particularly, intergranular corrosion resistance. In order to stably obtain the effect due to Zr, the amount of Zr is preferably 0.05% or more and more preferably 0.1% or more. Excessive addition of Zr deteriorates workability. Also, since Zr is expensive, the excessive addition of Zr increases costs. Therefore, the Zr content is preferably 0.3% or less.

(Sn: 0.5% or less)

As required, 0.5% or less of Sn may be contained to improve corrosion resistance. Particularly, in regard to corrosion resistance to exhaust gas condensate water and corrosion resistance to salt damage from the outer surface, which are required for heat exchangers that are intended applications of the embodiment, Sn has an effect of improving penetration resistance. In order to stably obtain the effect due to Sn, the amount of Sn is preferably 0.02% or more and more preferably 0.05% or more. However, excessive addition of Sn deteriorates toughness. Therefore, the Sn content is preferably 0.3% or less.

(Co: 0.2% or less)

As required, 0.2% or less of Co may be contained to improve secondary workability and toughness. In order to stably obtain the effect due to Co, the amount of Co is preferably 0.02% or more and more preferably 0.05% or more. However, excessive addition of Co increases costs. Therefore, the Co content is preferably 0.15% or less.

(Mg: 0.002% or less)

Since Mg has a deoxidation effect or the like, Mg is a useful element for refining. Also, Mg has an effect of improving workability and toughness by refining the structure. Therefore, as required, 0.002% or less of Mg may be contained. In order to stably obtain the effect due to Mg, the amount of Mg is preferably 0.0002% or more and more preferably 0.0005% or more. Since Mg deteriorates corrosion resistance by forming sulfides, the Mg content is preferably 0.0015% or less.

(Ca: 0.002% or less)

Since Ca has a deoxidation effect or the like, Ca is a useful element for refining and 0.002% or less of Ca may be contained as required. In order to stably obtain the effect due to Ca, the amount of Ca is preferably 0.0002% or more and more preferably 0.0004% or more. Since Ca deteriorates corrosion resistance by forming sulfides, the Ca content is preferably 0.0015% or less.

(REM: 0.01% or less)

According to a general definition, REM (rare earth metal elements) is the general term of elements consisting of 2 elements of scandium (Sc) and yttrium (Y) and 15 elements (lanthanoids) from lanthanum (La) to lutetium (Lu). REM may be added alone or a mixture thereof may be added. Since REM has a deoxidation effect or the like, REM is a useful element for refining. As required, 0.01% or less of REM may be contained. In order to stably obtain the effect due to REM, the amount of REM is preferably 0.0005% or more and more preferably 0.001% or more. Since the addition of REM increases costs, the REM content is preferably 0.008% or less.

(Sb: 0.5% or less)

As required, 0.5% or less of Sb may be contained to improve corrosion resistance. Particularly, in regard to corrosion resistance to exhaust gas condensate water and corrosion resistance to salt damage from the outer surface, which are required for heat exchangers that are intended applications of the embodiment, Sb has an effect of improving penetration resistance. However, excessive addition of Sb deteriorates toughness. In order to obtain the above-described effect, the Sb content is preferably 0.001% or more, more preferably 0.01% or more, and still more preferably 0.05% or more. In addition, the upper limit of the Sb content is 0.5% and preferably 0.3%.

(Ta: 0.5% or less)

As required, 0.5% or less of Ta may be contained to improve corrosion resistance. Particularly, in regard to corrosion resistance to exhaust gas condensate water and corrosion resistance to salt damage from the outer surface, which are required for heat exchangers that are intended applications of the embodiment, Ta has an effect of improving penetration resistance. However, excessive addition of Ta deteriorates toughness. In order to obtain the above-described effect, the Ta content is preferably 0.01% or more, more preferably 0.05% or more, and still more preferably 0.1% or more. In addition, the upper limit of the Ta content is 0.5% and preferably 0.4%.

(Ga: 0.01% or less)

Since Ga forms stable sulfides to improve corrosion resistance and hydrogen embrittlement resistance, 0.01% or less of Ga may be contained as required. In order to obtain the above-described effect, the Ga content is preferably 0.0002% or more and more preferably 0.0005% or more. In addition, the upper limit of the Ga content is 0.01% and preferably 0.005%.

Among inevitable impurities, from the viewpoint of weldability, the amount of P is preferably 0.04% or less and more preferably 0.035% or less.

In addition, from the viewpoint of corrosion resistance, the amount of S is preferably set to 0.02% or less and more preferably set to 0.01% or less.

The stainless steel of the embodiment is basically produced by a general method of producing a ferritic stainless steel. For example, a molten steel with the above-described chemical composition is produced in a converter or an electric furnace, the molten steel is refined in an AOD furnace, a VOD furnace or the like, and then a slab is produced by a continuous casting method or an ingot-making method. Next, processes of hot rolling-annealing of hot-rolled steel sheet-pickling-cold rolling-finish annealing-pickling are performed on the slab to produce a steel sheet. As required, annealing of a hot-rolled steel sheet may be omitted, and processes of cold rolling-finish annealing-pickling may be repeatedly performed.

Among the processes described herein, in order to form the film having the composition defined in the embodiment in the surface, it is preferable that conditions for finish annealing and pickling are taken into consideration. Particularly, in the finish annealing process and the pickling process, it is preferable that Si oxides and Al oxides which deteriorate brazeability are inhibited from being formed.

In the embodiment, the pickling process may be performed by combining a plurality of processes. Specifically, a salt method or a neutral salt electrolysis method is performed as a first process, and nitric acid electrolysis is performed as a second process. Immersion in nitric hydrofluoric acid is included as a third process in some cases. Further, as the second process, immersion in nitric hydrofluoric acid may be performed.

As described above, in the pickling process, the salt method is particularly useful for removing Si oxides and it is effective to increase temperature and increase time. Of these, in the case where the equipment is the same, an increased time lowers a line speed. This leads to a decrease in temperature of the material before immersion in a salt tank and also leads to deterioration in productivity.

In regard to the temperature in the salt method, since it is known that salt deterioration occurs at a temperature of 530° C. or higher, typically, the steel sheet is immersed in the salt having a temperature of approximately 450° C. to 480° C. However, in order to effectively remove Si oxides, the temperature in the salt method is set to be higher in the embodiment compared to a conventional method. Specifically, the temperature of the salt is preferably 490° C. or higher and is effective to be 500° C. or higher. The steel sheet is desirably immersed in the salt at a temperature of 500° C. to 530° C.

The immersion time in the salt is desirably 2 seconds or more and 10 seconds or less. However, an increase in the salt temperature easily leads to deterioration in surface properties and a stainless steel having a higher Cr content is more easily deteriorated. Therefore, it is desirable that the temperature of the salt and the immersion time satisfy $T \times (10t+2[Cr])/100 \leq 600$ (here, T represents temperature (° C.), t represents immersion time (sec), and [Cr] represents a Cr content (mass %)).

As described above, the salt method in the pickling process is the most useful for suppressing concentration of Si oxides. In this embodiment, in order to suppress the amount of generated scales including Si oxides, it is desirable that the finish annealing temperature is lowered. Generally, the finish annealing temperature is selected according to the chemical composition of the material, required mechanical properties, or the like. In the embodiment, it is effective and desirable to lower the finish annealing temperature by 5° C. to 20° C. lower than a typical finish annealing temperature which is selected to obtain desired mechanical properties. Specifically, the finish annealing temperature is desirably 1,000° C. or lower and more desirably 970° C. to 990° C. The lower limit temperature of the finish annealing temperature may be a temperature at which a cold-rolled sheet is subjected to finish annealing to have a metallographic structure having a recrystallization structure and desirable mechanical properties are provided.

Finally, a fuel supply system part of the embodiment will be described. The fuel supply system part of the embodiment includes a joined member by brazing. The member is composed of the ferritic stainless steel of the embodiment having a plate-like shape, a tubular shape, a rod-like shape, or the like, or a processed product thereof. The member of the embodiment may correspond to a part configured by a large number of members and having a complicated shape since the member is assembled by brazing.

In the brazing, as a brazing filler material, it is preferable to use a Cu brazing filler metal and/or a Ni brazing filler metal. Of these, in regard to the Ni brazing filler metal, it is preferable to use a Ni alloy brazing filler metal containing Cr and Si.

In the production process of the member composed of the stainless steel of the embodiment, in order to reduce an oxide film present in the surface of the stainless steel at the time of brazing, brazing is performed under the condition of a high degree of vacuum or a low dew point. Specifically, brazing is performed under the condition of a higher degree of vacuum or a lower dew point than that at which Cr and $Cr_2O_3$ are in equilibrium at a brazing temperature. The brazing can be performed under the conditions of, for example, a temperature of 950° C. to 1,200° C. and a holding time of approximately 10 minutes to 30 minutes in vacuum atmosphere or a hydrogen atmosphere. At the time of brazing, as a gas for atmosphere control or atmosphere substitution, argon gas, nitrogen gas, or the like may be used.

EXAMPLES

Hereinafter, the effects of the present invention are explained more clearly by reference to Examples. The present invention is not limited to the following Examples, and modifications can be appropriately made and implemented without departing from the features of the invention.

Example 1

30 kg of molten steels having chemical compositions shown in Table 1 were melted in a vacuum melting furnace to prepare 17 kg of flat steel ingots. Next, the ingots were subjected to hot rolling at a heating temperature of 1,200° C. to obtain hot-rolled steel sheets having a thickness of 4.5 mm. The hot-rolled steel sheets were subjected to annealing at a temperature of 950° C. and then scales were removed by alumina shot blasting. Then the steel sheets were subjected to cold rolling to have a thickness of 1 mm. Thereafter, the steel sheets were subjected to finish annealing and scales were removed by a salt method and immersion in nitric hydrofluoric acid.

The finish annealing temperature was set to temperatures shown in Table 1 and the holding time was set to 1 minute.

As a salt method, a method of heating a commercially available descaling alkali salt mainly containing NaOH and immersing a steel sheet in the alkali salt was applied and the heating temperature was set to temperatures shown in Table 1 and the immersion time was set to 5 seconds.

In the immersion in nitric hydrofluoric acid, a 3% HF-10% $HNO_3$ solution heated to 55° C. was used and the steel sheets were immersed in the solution for 10 seconds. The thus-obtained cold-rolled steel sheets (Invention Steels 1-1 to 1-12 and Comparative Steels 1-1 to 1-5) were used to evaluate brazing filler spreading abilities and analyze the surface film of the material.

[Brazing Filler Spreading Abilities]

Three steel sheets having a width of 40 mm and a length of 40 mm were sampled from each of the cold-rolled steel sheets and degreased using an organic solution. Next, 0.5 g of a pure Cu brazing filler metal (BCu-1) was put on the center of the steel sheet and the steel sheets were put into a vacuum furnace to heat the steel sheets at 1130° C. for 10 minutes. The degree of vacuum was approximately 50 Pa. The steel sheets were cooled after the heating and the size of the brazing filler metal was measured. From the result of measuring the size of the brazing filler metal, the area of the brazing filler metal was obtained to calculate a brazing filler spreading coefficient by the following Expression.

Brazing filler spreading coefficient=area of brazing filler metal after heat treatment/initial area of brazing filler metal In Table 2, brazing filler spreading coefficients are shown. Here, the brazing filler spreading coefficient is an average value of the three steel sheets. In the embodiment, a brazing filler spreading coefficient of 2 or more is good and a brazing filler spreading coefficient of 4 or more is further excellent.

[Analysis of Surface Film of Material]

The surface film of the material was analyzed by X-ray photoelectron spectroscopy (XPS). An XPS apparatus was manufactured by ULVAC-PHI, Inc. XPS was performed using mono-AlKα ray as an X-ray source under the condition in which the beam diameter of an X-ray was approximately 100 μm and the output angle thereof was 45 degrees and 90 degrees. From the result of quantitative analysis of the outermost surface by the XPS, the Cr cationic fraction $Cr_f$, the Si cationic fraction $Si_f$, and the Al cationic fraction $Al_f$ were obtained. Here, cations are only for metal elements. In addition, the thickness $d_f$ of the oxide film was obtained by an angle resolution method.

In Table 2, the thickness $d_f$ of the oxide film, the Cr cationic fraction $Cr_f$, the Si cationic fraction $Si_f$, and the Al cationic fraction $Al_f$ and the value of $d_f \times Cr_f + 5(Si_f + 3Al_f)$ (A value) are shown.

As shown in Table 2, in Invention Examples in which the value of $d_f \times Cr_f + 5(Si_f + 3Al_f)$ is 2.0 or less, the brazing filler spreading coefficient is 2 or more and brazeability is excellent.

As shown in Comparative Examples, in the case where the value of $d_f \times Cr_f + 5(Si_f + 3Al_f)$ is more than 2.0, the brazing filler spreading coefficient is less than 2 and brazeability is deteriorated.

It is observed that although Invention Steel 1-3 and Comparative Steel 1-1 had similar chemical compositions, the brazing filler spreading coefficients thereof were different. This is because the Si cationic fraction $Si_f$ in the film was high and the value of $d_f \times Cr_f + 5(Si_f + 3Al_f)$ was more than 2.0 in Comparative Steel 1-1 compared to Invention Steel 1-3.

It is considered that the temperature of salt was low and thus Si oxides formed in the annealing process were not removed but concentrated in Comparative Steel 1-1 compared to Invention Steel 1-3.

Although Comparative Steel 1-5 and Invention Steel 1-1 had the same chemical composition, in Comparative Steel 1-5, the annealing temperature was increased and the temperature of salt was lowered and thus the value of $d_f \times Cr_f + 5(Si_f + 3Al_f)$ was more than 2.0. Therefore, the brazing filler spreading coefficient was greatly decreased in Comparative Steel 1-5, compared to Invention Steel 1-1. It is considered that this is mainly because in Comparative Steel 1-5, Si oxides formed in the annealing process were not removed but concentrated.

TABLE 1

| | | | Chemical composition (mass %) | | | | | | | | | | | |
|---|---|---|---|---|---|---|---|---|---|---|---|---|---|---|
| | | | C | N | Si | Mn | P | S | Cr | Nb | Al | Ni | Cu | Mo | Others |
| Invention Example | 1-1 | Invention Steel 1-1 | 0.010 | 0.015 | 0.50 | 0.09 | 0.026 | 0.0008 | 19.37 | 0.38 | 0.022 | 0.29 | 0.44 | — | — |
| Invention Example | 1-2 | Invention Steel 1-2 | 0.008 | 0.011 | 0.43 | 0.13 | 0.029 | 0.0033 | 21.58 | 0.36 | 0.024 | — | 0.42 | 0.79 | |
| Invention Example | 1-3 | Invention Steel 1-3 | 0.007 | 0.009 | 0.17 | 0.18 | 0.022 | 0.0018 | 19.41 | 0.48 | 0.021 | 0.19 | 0.46 | 1.96 | |
| Invention Example | 1-4 | Invention Steel 1-4 | 0.006 | 0.009 | 0.93 | 0.26 | 0.021 | 0.0010 | 14.08 | 0.43 | 0.075 | — | — | — | |
| Invention Example | 1-5 | Invention Steel 1-5 | 0.007 | 0.011 | 0.22 | 1.18 | 0.035 | 0.0018 | 17.84 | 0.44 | 0.003 | — | — | 2.05 | |
| Invention Example | 1-6 | Invention Steel 1-6 | 0.006 | 0.012 | 0.32 | 0.34 | 0.025 | 0.0003 | 27.84 | 0.21 | 0.002 | — | — | — | |
| Invention Example | 1-7 | Invention Steel 1-7 | 0.018 | 0.017 | 0.39 | 0.48 | 0.026 | 0.0015 | 16.47 | 0.56 | 0.010 | 0.32 | 0.25 | — | 0.18Sn |
| Invention Example | 1-8 | Invention Steel 1-8 | 0.006 | 0.009 | 0.19 | 0.19 | 0.020 | 0.0010 | 17.25 | 0.46 | 0.029 | — | — | — | 0.92W, 0.002REM |
| Invention Example | 1-9 | Invention Steel 1-9 | 0.008 | 0.012 | 0.21 | 0.20 | 0.020 | 0.0008 | 15.22 | 0.42 | 0.048 | — | — | — | 0.12V, 0.0002Mg |
| Invention Example | 1-10 | Invention Steel 1-10 | 0.007 | 0.015 | 0.12 | 0.08 | 0.026 | 0.0007 | 17.45 | 0.35 | 0.018 | — | — | 1.05 | 0.1Sn, 0.0005Ca, 0.0004B |
| Invention Example | 1-11 | Invention Steel 1-11 | 0.012 | 0.016 | 0.22 | 0.22 | 0.020 | 0.0010 | 14.19 | 0.41 | 0.089 | — | — | — | 0.07Zr, 0.05Co |
| Invention Example | 1-12 | Invention Steel 1-12 | 0.008 | 0.010 | 0.21 | 0.23 | 0.022 | 0.0009 | 17.18 | 0.43 | 0.024 | — | — | — | 0.11Sb, 0.21Ta, 0.003Ga |
| Comparative Example | 1-12 | Comparative Steel 1-1 | 0.005 | 0.009 | 0.16 | 0.19 | 0.029 | 0.0007 | 19.41 | 0.48 | 0.034 | 0.17 | 0.47 | 1.90 | — |
| Comparative Example | 1-13 | Comparative Steel 1-2 | 0.007 | 0.013 | 0.35 | 0.35 | 0.024 | 0.0005 | <u>29.12</u> | 0.25 | 0.009 | — | — | — | |
| Comparative Example | 1-14 | Comparative Steel -3 | 0.007 | 0.011 | <u>1.37</u> | 0.27 | 0.022 | 0.0011 | 14.16 | 0.45 | 0.064 | — | — | — | |
| Comparative Example | 1-15 | Comparative Steel 1-4 | 0.006 | 0.014 | 0.34 | 0.32 | 0.031 | 0.0008 | 20.05 | 0.29 | <u>0.12</u> | — | — | — | |
| Comparative Example | 1-16 | Comparative Steel 1-5 | 0.010 | 0.015 | 0.50 | 0.09 | 0.026 | 0.0008 | 19.37 | 0.38 | 0.022 | 0.29 | 0.44 | — | |

| | | | Finish annealing temperature (° C.) | Salt method temperature (° C.) |
|---|---|---|---|---|
| Invention Example | 1-1 | Invention Steel 1-1 | 980 | 510 |
| Invention Example | 1-2 | Invention Steel 1-2 | 980 | 510 |
| Invention Example | 1-3 | Invention Steel 1-3 | 990 | 510 |
| Invention Example | 1-4 | Invention Steel 1-4 | 1010 | 520 |
| Invention Example | 1-5 | Invention Steel 1-5 | 970 | 510 |
| Invention Example | 1-6 | Invention Steel 1-6 | 970 | 500 |
| Invention Example | 1-7 | Invention Steel 1-7 | 1030 | 500 |
| Invention Example | 1-8 | Invention Steel 1-8 | 990 | 510 |
| Invention Example | 1-9 | Invention Steel 1-9 | 980 | 500 |
| Invention Example | 1-10 | Invention Steel 1-10 | 980 | 510 |
| Invention Example | 1-11 | Invention Steel 1-11 | 980 | 500 |
| Invention Example | 1-12 | Invention Steel 1-12 | 990 | 510 |
| Comparative Example | 1-12 | Comparative Steel 1-1 | 990 | 470 |
| Comparative Example | 1-13 | Comparative Steel 1-2 | 980 | 500 |
| Comparative Example | 1-14 | Comparative Steel -3 | 1030 | 490 |
| Comparative Example | 1-15 | Comparative Steel 1-4 | 970 | 500 |
| Comparative Example | 1-16 | Comparative Steel 1-5 | 1010 | 470 |

Note:
underlined values are out of the range of the present invention.

TABLE 2

| | | Brazeability Brazing filler spreading coefficient | Surface film | | | | |
|---|---|---|---|---|---|---|---|
| | | | $d_f$/nm | $Cr_f$ | $Si_f$ | $Al_f$ | A |
| Invention Steel 1-1 | 1-1 | 3.9 | 4.1 | 0.37 | — | — | 1.5 |
| Invention Steel 1-2 | 1-2 | 2.2 | 4.8 | 0.39 | — | — | 1.9 |
| Invention Steel 1-3 | 1-3 | 2.3 | 5.4 | 0.33 | — | — | 1.8 |
| Invention Steel 1-4 | 1-4 | 7.2 | 4.9 | 0.20 | 0.04 | 0.01 | 1.3 |
| Invention Steel 1-5 | 1-5 | 3.0 | 4.1 | 0.39 | — | — | 1.6 |
| Invention Steel 1-6 | 1-6 | 2.1 | 3.7 | 0.49 | — | — | 1.8 |
| Invention Steel 1-7 | 1-7 | 4.2 | 4.5 | 0.33 | — | — | 1.5 |
| Invention Steel 1-8 | 1-8 | 5.1 | 6.6 | 0.20 | — | — | 1.3 |
| Invention Steel 1-9 | 1-9 | 6.4 | 5.1 | 0.25 | — | — | 1.3 |
| Invention Steel 1-10 | 1-10 | 2.9 | 4.5 | 0.35 | — | — | 1.6 |
| Invention Steel 1-11 | 1-11 | 5.4 | 4.7 | 0.22 | — | 0.02 | 1.3 |
| Invention Steel 1-12 | 1-12 | 4.8 | 6.2 | 0.22 | — | — | 1.4 |
| Comparative Steel 1-1 | 1-12 | 1.1 | 5.0 | 0.26 | 0.21 | — | 2.4 |
| Comparative Steel 1-2 | 1-13 | 1.4 | 4.0 | 0.58 | — | — | 2.3 |
| Comparative Steel 1-3 | 1-14 | 1.6 | 5.5 | 0.19 | 0.22 | 0.07 | 3.2 |
| Comparative Steel 1-4 | 1-15 | 1.0 | 4.7 | 0.38 | — | 0.14 | 3.9 |
| Comparative Steel 1-5 | 1-16 | 1.4 | 4.6 | 0.30 | 0.17 | — | 2.2 |

$A = d_f \times Cr_f + 5(Si_f + 3Al_f)$
The symbol "—" in the result of surface film analysis indicates a value equal to or less than a detection limit.

Example 2

30 kg of molten steels having chemical compositions shown in Table 3 were melted in a vacuum melting furnace to prepare 17 kg of flat steel ingots. Next, the ingots were subjected to hot rolling at a heating temperature of 1,200° C. to obtain hot-rolled steel sheets having a thickness of 4.5 mm. The hot-rolled steel sheets were subjected to annealing at a temperature of 950° C. and then scales were removed by alumina shot blasting. Then, the steel sheets were subjected to cold rolling to have a thickness of 1 mm. Thereafter, the steel sheets were subjected to finish annealing and scales were removed (pickled) by a salt method and immersion in nitric hydrofluoric acid.

The finish annealing temperature was set to temperatures shown in Table 4 and the holding time was set to 1 minute.

As a salt method, a method of heating a commercially available descaling alkali salt mainly containing NaOH and immersing a steel sheet in the alkali salt was applied and the heating temperature was set to temperatures shown in Table 4 and the immersion time was set to 5 seconds.

In the immersion in nitric hydrofluoric acid, a 3% $HF$-10% $HNO_3$ solution heated to 55° C. was used and the steel sheets were immersed in the solution for 10 seconds.

The thus-obtained cold-rolled steel sheets (Invention Steels 2-1 to 2-12 and Comparative Steels 2-1 to 2-7) were used to evaluate strength, corrosion resistance and brazing filler spreading abilities and analyze the surface film of the material. Invention Steel 2-4 has the same composition as that of Comparative Example 2-6.

[Tensile (strength) Test at Room Temperature]

A test piece of JIS 13B was sampled from each of the cold-rolled steel sheets in an L direction and the test piece was subjected to a tensile test at room temperature. The obtained 0.2% proof stress values are shown in Table 4.

[Corrosion Test]

A corrosion test was performed under the condition in which degraded biofuel by oxidation was simulated. Two test pieces having a width of 25 mm and a length of 100 mm were sampled from each of the cold-rolled steel sheets and were degreased using an organic solvent. As test solutions, aqueous solutions in which the amount of formic acid was 0.1%, the amount of acetic acid was 1%, and NaCl was dissolved to set the concentration of Cl ions to be 100 ppm were used. The test temperature was set to 95° C. and the test time was set to 168 h. Test conditions other than the above-described conditions were set according to JASO-M611-92-A.

Corrosion products after the corrosion test were removed and then a corrosion mass loss of each test piece was measured and the presence of local corrosion was observed. The corrosion mass loss was calculated from variations in the mass before and after the test. The presence of local corrosion was determined as follows by observing the entire surfaces of the test piece using an optical microscope. That is, 10 μm is a detection limit of the value of the depth of corrosion obtained by being measured using a focal depth method. A case in which a corrosion spot having a depth of more than 10 μm was detected was defined as "presence of local corrosion", and a case in which a corrosion spot having a depth of more than 10 μm was not detected was defined as "absence of local corrosion".

A case in which at least one of two test pieces had a corrosion mass loss of 0.5 g·m$^{-2}$ or more, which was equivalent to a detection limit, and/or local corrosion was present in at least one of two test pieces was determined to be a failure (x). In addition, a case in which both of two test pieces had a corrosion mass loss of less than 0.5 g·m$^{-2}$ and local corrosion was not observed was determined to be a pass (∘). The results are shown in Table 4.

[Brazing Filler Spreading Abilities]

Three steel sheets having a width of 40 mm and a length of 40 mm were sampled from each of the cold-rolled steel sheets and degreased using an organic solution. Next, 0.5 g of a pure Cu brazing filler metal (BCu-1) was put on the center of the steel sheets and the steel sheets were put into a vacuum furnace to heat the steel sheets at 1130° C. for 10 minutes. The degree of vacuum was approximately 50 Pa. The steel sheets were cooled after the heating and the size of the brazing filler metal was measured. From the result of measuring the size of the brazing filler metal, the area of the brazing filler metal was obtained to calculate a brazing filler spreading coefficient by the following Expression.

Brazing filler spreading coefficient=area of brazing filler metal after heat treatment/initial area of brazing filler metal In Table 4, brazing filler spreading coefficients are shown. Here, the brazing filler spreading coefficient is an average value of the three steel sheets. In the embodiment, a brazing filler spreading coefficient of 2 or more is good and a brazing filler spreading coefficient of 4 or more is further excellent.

[Analysis of Surface Film of Material]

The surface film of the material was analyzed by X-ray photoelectron spectroscopy (XPS). An XPS apparatus was manufactured by ULVAC-PHI, Inc. XPS was performed using mono-AlKα ray as an X-ray source under the condition in which the beam diameter of an X-ray was approximately 100 μm and the output angle thereof was 45 degrees and 90 degrees. From the result of quantitative analysis of the outermost surface by the XPS, the Cr cationic fraction $Cr_f$, the Si cationic fraction $Si_f$, and the Al cationic fraction $Al_f$ were obtained. Here, cations are only for metal elements. In addition, the thickness $d_f$ of the oxide film was obtained by an angle resolution method.

In Table 4, the thickness $d_f$ of the oxide film, the Cr cationic fraction $Cr_f$, the Si cationic fraction $Si_f$, and the Al cationic fraction $Al_f$ and the value of $d_f \times Cr_f + 5(Si_f + 3Al_f)$ (A value) are shown.

As shown in Table 4, in Invention Examples 2-1 to 2-12, the 0.2% proof stress was 250 MPa or more and corrosion was not present in the corrosion test under the condition in which degraded biofuel by oxidation was simulated. Also, the brazing filler spreading coefficient was 2 or more and brazeability was excellent.

In Comparative Example 2-1 in which the Cr content was less than 15%, the value of $d_f \times Cr_f + 5(Si_f + 3Al_f)$ was 2.0 or less. However, the Cr cationic fraction $Cr_f$ was less than 0.18. The brazing filler spreading coefficient was 2 or more but under the environment in which degraded biofuel by oxidation was simulated, corrosion resistance was deteriorated.

In Comparative Examples 2-2, 2-4 and 2-6 in which the value of $d_f \times Cr_f + 5(Si_f + 3Al_f)$ was more than 2.0, the brazing filler spreading coefficient was less than 2 and brazeability was deteriorated.

In Comparative Example 2-3, since the Cr content was high, the value of $d_f \times Cr_f + 5(Si_f + 3Al_f)$ was more than 2.0, the Cr cationic fraction $Cr_f$ was increased, and the brazing filler spreading coefficient was less than 2.

In Comparative Example 2-5, since the Nb content in the steel sheet was low, the 0.2% proof stress was less than 250 MPa and strength was deteriorated.

In Comparative Example 2-7, since the Cr content was high, the value of $d_f \times Cr_f + 5(Si_f + 3Al_f)$ was more than 2.0, and the brazing filler spreading coefficient was less than 2.

TABLE 3

| | | Chemical composition (mass %) | | | | | | | | | | | |
|---|---|---|---|---|---|---|---|---|---|---|---|---|---|
| | | C | N | Si | Mn | P | S | Cr | Nb | Al | Ni | Cu | Mo | Others |
| Invention Example 2-1 | Invention Steel 2-1 | 0.009 | 0.015 | 0.48 | 0.48 | 0.032 | 0.0004 | 15.05 | 0.34 | 0.004 | — | — | — | — |
| Invention Example 2-2 | Invention Steel 2-2 | 0.011 | 0.018 | 0.38 | 0.29 | 0.024 | 0.0012 | 17.07 | 0.39 | 0.014 | — | — | — | — |
| Invention Example 2-3 | Invention Steel 2-3 | 0.013 | 0.011 | 0.11 | 0.12 | 0.019 | 0.0006 | 22.87 | 0.41 | 0.029 | — | — | — | — |
| Invention Example 2-4 | Invention Steel 2-4 | 0.010 | 0.015 | 0.50 | 0.09 | 0.026 | 0.0008 | 19.37 | 0.38 | 0.022 | 0.29 | 0.44 | — | — |
| Invention Example 2-5 | Invention Steel 2-5 | 0.008 | 0.011 | 0.43 | 0.13 | 0.029 | 0.0033 | 21.58 | 0.36 | 0.024 | — | 0.42 | 0.79 | — |
| Invention Example 2-6 | Invention Steel 2-6 | 0.007 | 0.009 | 0.17 | 0.18 | 0.022 | 0.0018 | 19.41 | 0.48 | 0.021 | 0.19 | 0.46 | 1.96 | — |
| Invention Example 2-7 | Invention Steel 2-7 | 0.007 | 0.011 | 0.22 | 1.18 | 0.035 | 0.0018 | 17.84 | 0.44 | 0.003 | — | — | 2.05 | — |
| Invention Example 2-8 | Invention Steel 2-8 | 0.006 | 0.009 | 0.19 | 0.19 | 0.020 | 0.0010 | 17.25 | 0.46 | 0.029 | — | — | — | 0.92W, 0.002REM |
| Invention Example 2-9 | Invention Steel 2-9 | 0.008 | 0.012 | 0.21 | 0.20 | 0.020 | 0.0008 | 15.22 | 0.42 | 0.048 | — | — | — | 0.12V, 0.0002Mg |
| Invention Example 2-10 | Invention Steel 2-10 | 0.007 | 0.015 | 0.12 | 0.08 | 0.026 | 0.0007 | 17.45 | 0.35 | 0.018 | — | — | 1.05 | 0.1Sn, 0.0005Ca, 0.0004B |
| Invention Example 2-11 | Invention Steel 2-11 | 0.008 | 0.008 | 0.15 | 0.15 | 0.025 | 0.0044 | 15.14 | 0.25 | 0.002 | — | — | — | 0.11Zr, 0.06Co |
| Invention Example 2-12 | Invention Steel 2-12 | 0.008 | 0.010 | 0.21 | 0.23 | 0.022 | 0.0009 | 17.18 | 0.43 | 0.024 | — | — | — | 0.11Sb, 0.21Ta, 0.003Ga |
| Comparative Example 2-1 | Comparative Steel 2-1 | 0.006 | 0.009 | 0.93 | 0.26 | 0.021 | 0.0010 | 14.88 | 0.43 | 0.075 | — | — | — | — |
| Comparative Example 2-2 | Comparative Steel 2-2 | 0.005 | 0.009 | 0.16 | 0.19 | 0.029 | 0.0007 | 19.41 | 0.48 | 0.034 | 0.17 | 0.47 | 1.90 | — |
| Comparative Example 2-3 | Comparative Steel 2-3 | 0.007 | 0.013 | 0.35 | 0.35 | 0.024 | 0.0005 | 29.12 | 0.26 | 0.009 | — | — | — | — |
| Comparative Example 2-4 | Comparative Steel 2-4 | 0.006 | 0.014 | 0.34 | 0.32 | 0.031 | 0.0008 | 20.05 | 0.29 | 0.12 | — | — | — | — |
| Comparative Example 2-5 | Comparative Steel 2-5 | 0.004 | 0.006 | 0.11 | 0.07 | 0.016 | 0.0011 | 15.14 | 0.15 | 0.036 | — | — | — | — |
| Comparative Example 2-6 | Comparative Steel 2-6 | 0.010 | 0.015 | 0.50 | 0.09 | 0.026 | 0.0008 | 19.37 | 0.38 | 0.022 | 0.29 | 0.44 | — | — |
| Comparative Example 2-7 | Comparative Steel 2-7 | 0.011 | 0.013 | 0.12 | 0.14 | 0.023 | 0.0005 | 23.14 | 0.40 | 0.032 | — | — | — | — |

| | | Chemical composition (mass %) 8(C + N) + 0.1 |
|---|---|---|
| Invention Example 2-1 | Invention Steel 2-1 | 0.29 |
| Invention Example 2-2 | Invention Steel 2-2 | 0.33 |
| Invention Example 2-3 | Invention Steel 2-3 | 0.29 |
| Invention Example 2-4 | Invention Steel 2-4 | 0.30 |
| Invention Example 2-5 | Invention Steel 2-5 | 0.25 |

TABLE 3-continued

| | | |
|---|---|---|
| Invention Example 2-6 | Invention Steel 2-6 | 0.23 |
| Invention Example 2-7 | Invention Steel 2-7 | 0.24 |
| Invention Example 2-8 | Invention Steel 2-8 | 0.22 |
| Invention Example 2-9 | Invention Steel 2-9 | 0.26 |
| Invention Example 2-10 | Invention Steel 2-10 | 0.28 |
| Invention Example 2-11 | Invention Steel 2-11 | 0.23 |
| Invention Example 2-12 | Invention Steel 2-12 | 0.24 |
| Comparative Example 2-1 | Comparative Steel 2-1 | 0.22 |
| Comparative Example 2-2 | Comparative Steel 2-2 | 0.21 |
| Comparative Example 2-3 | Comparative Steel 2-3 | 0.26 |
| Comparative Example 2-4 | Comparative Steel 2-4 | 0.26 |
| Comparative Example 2-5 | Comparative Steel 2-5 | 0.18 |
| Comparative Example 2-6 | Comparative Steel 2-6 | 0.30 |
| Comparative Example 2-7 | Comparative Steel 2-7 | 0.29 |

Note:
underlined values are out of the range of the present invention.

TABLE 4

| | Surface film | | | | Tensile at room temperature 0.2 proof stress (MPa) | Corrosion test | Brazeability Brazing filler spreading coefficient | Finish annealing temperature (° C.) | Salt method temperature (° C.) |
|---|---|---|---|---|---|---|---|---|---|
| | $d_f$/nm | $Cr_f$ | $Si_f$ | $Al_f$ | A | | | | |
| Invention Example 2-1 | 6.7 | 0.20 | — | — | 1.3 | 270 | ○ | 7.1 | 970 | 500 |
| Invention Example 2-2 | 5.3 | 0.22 | — | — | 1.2 | 312 | ○ | 6.9 | 970 | 500 |
| Invention Example 2-3 | 4.1 | 0.46 | — | — | 1.9 | 325 | ○ | 2.1 | 990 | 510 |
| Invention Example 2-4 | 4.1 | 0.37 | — | — | 1.5 | 315 | ○ | 3.9 | 980 | 510 |
| Invention Example 2-5 | 4.8 | 0.39 | — | — | 1.9 | 326 | ○ | 2.2 | 980 | 510 |
| Invention Example 2-6 | 5.4 | 0.33 | — | — | 1.8 | 364 | ○ | 2.3 | 990 | 510 |
| Invention Example 2-7 | 4.1 | 0.39 | — | — | 1.6 | 352 | ○ | 3.0 | 970 | 510 |
| Invention Example 2-8 | 6.6 | 0.20 | — | — | 1.3 | 343 | ○ | 5.1 | 990 | 510 |
| Invention Example 2-9 | 5.1 | 0.25 | — | — | 1.3 | 289 | ○ | 6.4 | 980 | 500 |
| Invention Example 2-10 | 4.5 | 0.35 | — | — | 1.6 | 278 | ○ | 2.9 | 980 | 510 |
| Invention Example 2-11 | 5.9 | 0.21 | — | — | 1.2 | 258 | ○ | 6.8 | 990 | 500 |
| Invention Example 2-12 | 6.2 | 0.22 | — | — | 1.4 | 339 | ○ | 4.8 | 990 | 510 |
| Comparative Example 2-1 | 4.9 | 0.17 | 0.04 | 0.01 | 1.2 | 295 | x | 7.2 | 1010 | 520 |
| Comparative Example 2-2 | 5.0 | 0.26 | 0.21 | — | 2.4 | 359 | ○ | 1.1 | 990 | 470 |
| Comparative Example 2-3 | 4.0 | 0.58 | — | — | 2.3 | 333 | ○ | 1.4 | 980 | 500 |
| Comparative Example 2-4 | 4.7 | 0.38 | — | 0.14 | 3.9 | 325 | ○ | 1.0 | 970 | 500 |
| Comparative Example 2-5 | 5.4 | 0.20 | — | — | 1.1 | 234 | ○ | 7.5 | 930 | 500 |
| Comparative Example 2-6 | 4.6 | 0.30 | 0.17 | — | 2.2 | 305 | ○ | 1.4 | 1010 | 470 |
| Comparative Example 2-7 | 4.4 | 0.50 | — | — | 2.2 | 321 | ○ | 1.4 | 1010 | 490 |

[Corrosion test] ○: pass, and x: failure
[Surface film] A = $d_f \times Cr_f + 5(Si_f + 3 Al_f)$, and the symbol "—" indicates a value which is equal to or less than a detection limit.

INDUSTRIAL APPLICABILITY

The ferritic stainless steel sheet according to the first embodiment having excellent brazeability is suitably used as a material for a joined member by brazing, such as automotive parts such as an EGR cooler, an oil cooler, an exhaust heat recovery device, and a fuel delivery system part, and heat exchangers such as a secondary heat exchanger of a latent heat recovery type hot water supply by gas, a plate type heat exchanger of a $CO_2$ refrigerant heat pump type hot water supply (commonly known as EcoCute (registered trademark)), and various types of plate type heat exchangers.

The ferritic stainless steel according to the second embodiment is suitably used for automotive fuel supply system parts, particularly, direct injection engine fuel supply system parts in which pulsation resulting from variations in fuel pressure is easily generated and is applicable regardless of region. The ferritic stainless steel according to the second embodiment is particularly suitably used for parts, such as a delivery pipe, a fuel pump part, and a fuel pressure adjusting part, which are disposed in the proximity of an engine, used under a high pressure environment, and easily heated to a high temperature, among the fuel supply system parts.

The invention claimed is:

1. A ferritic stainless steel sheet comprising, by mass %:
C: 0.03% or less;
N: 0.002% or more and 0.05% or less;
Si: more than 0.1% and 1% or less;
Mn: 1.2% or less;
Cr: 14% or more and 28% or less;
Nb: 8(C+N) or more and 0.8% or less; and
Al: 0.002% or more and 0.1% or less,
with a balance being Fe and inevitable impurities,
wherein a film satisfying Expression 1 is formed in a surface thereof, $$d_f \times Cr_f + 5(Si_f + 3Al_f) \leq 2.0 \quad \text{(Expression 1)}$$

in Expression 1, $d_f$ represents a thickness of the film in terms of nm, $Cr_f$ represents a Cr cationic fraction in the film, $Si_f$ represents a Si cationic fraction in the film, and $Al_f$ represents an Al cationic fraction in the film,
wherein the ferritic stainless steel sheet has a brazing filler spreading coefficient of 2 or more.

2. The ferritic stainless steel sheet according to claim 1, further comprising, by mass %:
one or more selected from Ni: 5% or less, Cu: 1.5% or less, and Mo: 3% or less.

3. The ferritic stainless steel sheet according to claim 1, further comprising, by mass %:
one or more selected from V: 0.5% or less, W: 1% or less, B: 0.005% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

4. A heat exchanger comprising:
a heat exchange section including a joined member by brazing,
wherein the member is composed of the ferritic stainless steel sheet according to claim 1.

5. A heat exchanger, comprising,
the ferritic stainless steel sheet according to claim 1.

6. A heat exchanger, comprising,
the ferritic stainless steel sheet according to claim 2.

7. A heat exchanger, comprising,
the ferritic stainless steel sheet according to claim 3.

8. A ferritic stainless steel comprising, by mass %:
C: 0.03% or less;
N: 0.002% or more and 0.05% or less;
Si: more than 0.1% and 1% or less;
Mn: 1.2% or less;
Cr: 15% or more and 23% or less;
Nb: 8(C+N)+0.1% or more and 0.8% or less; and
Al: 0.002% or more and 0.1% or less,
with a balance being Fe and inevitable impurities,
wherein a film satisfying Expressions 2 and 3 is formed in a surface thereof, $$d_f \times Cr_f + 5(Si_f + 3Al_f) \leq 2.0 \quad \text{(Expression 2)}$$

$$0.18 \leq Cr_f \leq 0.5 \quad \text{(Expression 3)}$$

in Expression 2, $d_f$ represents a thickness of the film in terms of nm, $Si_f$ represents a Si cationic fraction in the film, and $Al_f$ represents an Al cationic fraction in the film, and in Expressions 2 and 3, $Cr_f$ represents a Cr cationic fraction in the film,
wherein the ferritic stainless steel has a brazing filler spreading coefficient of 2 or more.

9. The ferritic stainless steel according to claim 8, further comprising, by mass %:
one or more selected from Ni: 2% or less, Cu: 1.5% or less, and Mo: 3% or less.

10. The ferritic stainless steel according to claim 8, further comprising, by mass %:
one or more selected from V: 0.5% or less, W: 1% or less, B: 0.005% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

11. A fuel supply system part comprising:
a joined member by brazing,
wherein the member is composed of the ferritic stainless steel according to claim 8.

12. A fuel supply system part, comprising,
the ferritic stainless steel sheet according to claim 8.

13. A fuel supply system part, comprising,
the ferritic stainless steel sheet according to claim 9.

14. A fuel supply system part, comprising,
the ferritic stainless steel sheet according to claim 10.

15. The ferritic stainless steel sheet according to claim 2, further comprising, by mass %:
one or more selected from V: 0.5% or less, W: 1% or less, B: 0.005% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

16. A heat exchanger comprising:
a heat exchange section including a joined member by brazing,
wherein the member is composed of the ferritic stainless steel sheet according to claim 2.

17. A heat exchanger comprising:
a heat exchange section including a joined member by brazing,
wherein the member is composed of the ferritic stainless steel sheet according to claim 3.

18. A heat exchanger comprising:
a heat exchange section including a joined member by brazing,
wherein the member is composed of the ferritic stainless steel sheet according to claim 15.

19. A heat exchanger, comprising,
the ferritic stainless steel sheet according to claim 15.

20. The ferritic stainless steel according to claim 9, further comprising, by mass %:
one or more selected from V: 0.5% or less, W: 1% or less, B: 0.005% or less, Sn: 0.5% or less, Co: 0.2% or less, Mg: 0.002% or less, Ca: 0.002% or less, REM: 0.01% or less, Sb: 0.5% or less, Ta: 0.5% or less, and Ga: 0.01% or less.

* * * * *